(12) United States Patent
McKay

(10) Patent No.: US 11,279,173 B2
(45) Date of Patent: Mar. 22, 2022

(54) WHEELS FOR NON-MOTORIZED VEHICLES

(71) Applicant: Gatekeeper Systems, Inc., Foothill Ranch, CA (US)

(72) Inventor: John C. McKay, Placentia, CA (US)

(73) Assignee: Gatekeeper Systems, Inc., Foothill Ranch, CA (US)

( * ) Notice: Subject to any disclaimer, the term of this patent is extended or adjusted under 35 U.S.C. 154(b) by 316 days.

(21) Appl. No.: 16/381,393

(22) Filed: Apr. 11, 2019

(65) Prior Publication Data

US 2020/0047551 A1    Feb. 13, 2020

Related U.S. Application Data

(60) Continuation of application No. 15/170,065, filed on Jun. 1, 2016, now abandoned, which is a division of
(Continued)

(51) Int. Cl.
*B60B 33/00* (2006.01)
*B60B 1/00* (2006.01)
(Continued)

(52) U.S. Cl.
CPC ............ *B60B 33/0028* (2013.01); *B23P 6/00* (2013.01); *B60B 1/006* (2013.01); *B60B 3/002* (2013.01);
(Continued)

(58) Field of Classification Search
CPC ............ B60B 33/0028; B60B 33/0036; B60B 33/0063; B60B 33/0078; B60B 1/006; B60B 3/002; B60B 5/02; B60B 7/01; B60B 7/04; B60B 7/065; B60B 7/14; B60B 19/06; B60B 19/12; B60B 21/02; B60B 23/04; B60B 23/10; B60B 23/06; B60B 25/08;
(Continued)

(56) References Cited

U.S. PATENT DOCUMENTS 750,984 A    2/1904  Kennedy
1,408,714 A  3/1922  Preston
(Continued)

FOREIGN PATENT DOCUMENTS

CN    201520161 U    7/2010
EP    0698404 A2     2/1996
(Continued)

OTHER PUBLICATIONS

Gatekeeper Wheel Repair Manual, May 2010, in 3 pages.
(Continued)

*Primary Examiner* — William L Miller
(74) *Attorney, Agent, or Firm* — Knobbe, Martens, Olson & Bear, LLP

(57) ABSTRACT

A wheel for a non-motorized vehicle (e.g., a shopping cart) can include a housing assembly and a tread assembly. The housing assembly can be configured to sealingly house electronics or other components. The tread assembly can removably mate with the housing assembly such that the electronics or other components remain closed and/or sealed within the housing assembly when the tread assembly is mated or unmated with the housing assembly.

14 Claims, 35 Drawing Sheets

Related U.S. Application Data application No. 14/189,966, filed on Feb. 25, 2014, now Pat. No. 9,358,835.

(60) Provisional application No. 61/773,534, filed on Mar. 6, 2013.

(51) Int. Cl.

| | | |
|---|---|---|
| *B60B 19/06* | (2006.01) | |
| *B60B 23/10* | (2006.01) | |
| *B60B 3/00* | (2006.01) | |
| *B60B 5/02* | (2006.01) | |
| *B60B 19/12* | (2006.01) | |
| *B60B 21/02* | (2006.01) | |
| *B60B 23/04* | (2006.01) | |
| *B60B 7/04* | (2006.01) | |
| *B60B 7/14* | (2006.01) | |
| *B60B 7/06* | (2006.01) | |
| *B60B 7/01* | (2006.01) | |
| *B60C 7/24* | (2006.01) | |
| *B23P 6/00* | (2006.01) | |
| *B60B 23/06* | (2006.01) | |
| *B60B 25/08* | (2006.01) | |
| *B60C 11/02* | (2006.01) | |

(52) U.S. Cl.
CPC .............. *B60B 5/02* (2013.01); *B60B 7/01* (2013.01); *B60B 7/04* (2013.01); *B60B 7/065* (2013.01); *B60B 7/14* (2013.01); *B60B 19/06* (2013.01); *B60B 19/12* (2013.01); *B60B 21/02* (2013.01); *B60B 23/04* (2013.01); *B60B 23/10* (2013.01); *B60B 33/0036* (2013.01); *B60C 7/24* (2013.01); *B60B 23/06* (2013.01); *B60B 25/08* (2013.01); *B60B 33/0063* (2013.01); *B60B 33/0078* (2013.01); *B60B 2200/20* (2013.01); *B60B 2200/43* (2013.01); *B60B 2200/49* (2013.01); *B60B 2310/316* (2013.01); *B60B 2310/321* (2013.01); *B60B 2320/00* (2013.01); *B60B 2320/10* (2013.01); *B60B 2360/10* (2013.01); *B60B 2360/30* (2013.01); *B60B 2360/50* (2013.01); *B60B 2900/113* (2013.01); *B60B 2900/212* (2013.01); *B60B 2900/313* (2013.01); *B60B 2900/3313* (2013.01); *B60B 2900/721* (2013.01); *B60C 11/02* (2013.01); *B60Y 2200/142* (2013.01); *Y10T 16/184* (2015.01)

(58) Field of Classification Search
CPC ............ B60B 2200/20; B60B 2200/43; B60B 2200/49; B60B 2310/316; B60B 2310/321; B60B 2320/00; B60B 2320/10; B60B 2360/10; B60B 2360/30; B60B 2360/50; B60B 2900/113; B60B 2900/212; B60B 2900/313; B60B 2900/3313; B60B 2900/721; B23P 6/00; B60C 7/24; B60C 11/02; Y10T 16/184; Y10T 16/18; B60Y 2200/142
USPC ..... 16/45, 18 R; 152/176, 185.1, 323, 379.3, 152/380, 385, DIG. 18; 301/5.1, 5.306, 301/5.309, 35.51, 37.101, 37.102, 37.371, 301/108.1, 108.4
See application file for complete search history.

(56) References Cited

U.S. PATENT DOCUMENTS

| | | |
|---|---|---|
| 1,686,301 A | 10/1928 | Wagenhorst |
| 1,797,195 A | 3/1931 | Burdette |
| 2,083,766 A | 6/1937 | Wittkopp |
| 2,584,073 A | 1/1952 | Williams |
| 2,707,795 A | 5/1955 | Skupas |
| 2,738,542 A | 3/1956 | Clark, Jr. |
| 2,775,313 A | 12/1956 | Kurvers |
| 2,915,776 A | 12/1959 | Hanson et al. |
| 2,942,290 A | 6/1960 | Segal |
| 3,228,089 A | 1/1966 | Turner |
| 3,567,287 A | 3/1971 | Nutter |
| 4,000,912 A | 1/1977 | Donald et al. |
| 4,114,952 A | 9/1978 | Kimmell |
| 4,372,569 A | 2/1983 | Otterson |
| 4,485,521 A | 12/1984 | Welsch et al. |
| 4,783,880 A | 11/1988 | Chapman et al. |
| 4,923,252 A | 5/1990 | Plamper et al. |
| 5,503,466 A | 4/1996 | Lew |
| 5,831,530 A | 11/1998 | Lace et al. |
| 5,873,145 A | 2/1999 | Chou |
| 6,286,572 B1 | 9/2001 | Chen |
| 6,298,891 B1 | 10/2001 | Harris |
| 6,362,728 B1 | 3/2002 | Lace et al. |
| 6,467,519 B1 | 10/2002 | Owen |
| 6,532,623 B1 | 3/2003 | Watanabe |
| 6,539,578 B1 | 4/2003 | Guttmann et al. |
| 6,607,201 B2 | 8/2003 | Marshburn |
| 6,945,366 B2 | 9/2005 | Taba |
| 7,159,632 B2 | 1/2007 | Fukui |
| 7,316,252 B1 | 1/2008 | Heard |
| 7,334,617 B2 | 2/2008 | Hill, III et al. |
| 7,438,366 B2 | 10/2008 | Machamer et al. |
| 7,658,247 B2 | 2/2010 | Carter |
| 7,878,600 B2 | 2/2011 | Krantz |
| 7,944,368 B2 | 5/2011 | Carter et al. |
| 8,046,160 B2 | 10/2011 | Carter et al. |
| 8,292,018 B2 | 10/2012 | Huang |
| 8,463,540 B2 | 6/2013 | Hannah et al. |
| 8,464,843 B2 | 6/2013 | Qiu et al. |
| 8,499,414 B1 | 8/2013 | Lemeur, Jr. |
| 8,578,984 B2 | 11/2013 | Hannah et al. |
| 8,607,414 B1 | 12/2013 | Kinsela |
| 8,674,845 B2 | 3/2014 | Carter et al. |
| 8,714,220 B2 | 5/2014 | Tso et al. |
| 8,751,148 B2 | 6/2014 | Carter et al. |
| 8,820,447 B2 | 9/2014 | Carter et al. |
| 8,894,086 B2 | 11/2014 | Ekbote |
| 8,973,716 B2 | 3/2015 | McKay et al. |
| 9,205,702 B2 | 12/2015 | Hannah et al. |
| 9,358,835 B2 | 6/2016 | McKay |
| 9,403,548 B2 | 8/2016 | Hannah et al. |
| 9,630,639 B2 | 4/2017 | Carter et al. |
| 9,669,659 B2 | 6/2017 | McKay et al. |
| 10,730,349 B2* | 8/2020 | Bateman, Jr. ............. B60C 7/24 |
| 2002/0190492 A1 | 12/2002 | Strong |
| 2004/0111830 A1 | 6/2004 | Cooper et al. |
| 2005/0257871 A1 | 11/2005 | Hill et al. |
| 2006/0117524 A1 | 6/2006 | Yan |
| 2007/0143957 A1 | 6/2007 | Baek |
| 2008/0143070 A1 | 6/2008 | Sonnendorfer et al. |
| 2008/0179940 A1 | 7/2008 | Hill et al. |
| 2008/0238016 A1 | 10/2008 | Chen et al. |
| 2008/0303337 A1 | 12/2008 | Krantz |
| 2010/0052412 A1 | 3/2010 | Morris |
| 2011/0192515 A1 | 8/2011 | Fiorentin et al. |
| 2012/0048636 A1 | 3/2012 | Huang |
| 2012/0193969 A1 | 8/2012 | Tso et al. |
| 2012/0241531 A1 | 9/2012 | Werner |
| 2012/0285595 A1 | 11/2012 | Su |
| 2014/0062165 A1 | 3/2014 | Hannah et al. |
| 2014/0109341 A1 | 4/2014 | Plate |
| 2015/0197266 A1 | 7/2015 | Carter et al. |
| 2017/0050466 A1 | 2/2017 | McKay |
| 2018/0110490 A1 | 4/2018 | Nam et al. |
| 2021/0229491 A1 | 7/2021 | McKay |

FOREIGN PATENT DOCUMENTS

| | | |
|---|---|---|
| GB | 1459998 | 12/1976 |
| JP | 2010-132010 | 6/2010 |

(56) References Cited

FOREIGN PATENT DOCUMENTS

| WO | WO 2009/137422 A1 | 11/2009 |
| WO | WO 2013/043916 | 3/2013 |
| WO | WO 2014/137669 A1 | 9/2014 |

OTHER PUBLICATIONS

International Search Report and Written Opinion in corresponding International Patent Application No. PCT/US2014/018382, dated Jul. 2, 2014, in 11 pages.
International Preliminary Report on Patentability in corresponding International Patent Application No. PCT/US2014/018382, dated Sep. 17, 2015, in 8 pages.
Extended European Search Report in corresponding European Patent Application No. 14759566.4, dated Jan. 18, 2016, in 9 pages.
Office Action in corresponding Chinese Patent Application No. 201480006148.4, dated Jun. 17, 2016, in 17 pages.
Office Action in corresponding Chinese Patent Application No. 201480006148.4, dated Feb. 8, 2017, in 17 pages.
Office Action in corresponding European Patent Application No. 14759566.4, dated Dec. 16, 2016, in 5 pages.
Office Action in corresponding Canadian Patent Application No. 2897315, dated Dec. 5, 2019, in 3 pages.

\* cited by examiner

WHEELS FOR NON-MOTORIZED VEHICLES

INCORPORATION BY REFERENCE TO ANY PRIORITY APPLICATIONS

All applications for which a foreign or domestic priority claim is identified in the Application Data Sheet as filed with the present application are hereby incorporated by reference herein under 37 C.F.R. § 1.57.

The present application is a continuation of U.S. patent application Ser. No. 15/170,065, filed Jun. 1, 2016, which is a division of U.S. patent application Ser. No. 14/189,966, filed Feb. 25, 2014, now U.S. Pat. No. 9,358,835, which claims priority benefit under 35 U.S.C. § 119(e) of U.S. Provisional Application No. 61/773,534, filed Mar. 6, 2013; the entirety of each of the foregoing applications is hereby incorporated by reference herein.

BACKGROUND

Field

The present disclosure relates to replaceable treads for wheels and wheels having replaceable treads usable with non-motorized vehicles.

Description of the Related Art

Non-motorized wheeled vehicles, such as human-propelled carts (e.g., shopping carts), can include two or more wheels. Vehicle wheels incur wear as a result of use or damage. For example, prolonged use of the wheel can cause a tread of the wheel to become worn down. Accordingly, the wheel may need to be replaced.

SUMMARY

Various embodiments are directed to wheels and wheel treads for non-motorized vehicles (e.g., human-propelled carts). Replacement of vehicle wheels can incur substantial expense, particularly in implementations in which the vehicle wheel includes expensive electronic components (e.g., theft prevention electronics in a shopping cart wheel). Accordingly, in certain embodiments, rather than replacing the entire wheel, the tread of the wheel can be replaced. In certain such embodiments, the tread can be configured to be axially removed and installed on the wheel.

Certain wheels require complete or substantially complete removal and/or disassembly of the wheel from the wheeled vehicle in order to replace the treads of the wheels. Furthermore, some wheels may require the disassembly of a sealed portion of the wheel in order to replace the tread. For example, some embodiments may require the opening of a chamber (e.g., in a central portion of the wheel) in order to replace the tread. However, in certain instances, it can be desirable to avoid disassembling certain portions of the wheel to replace the tread. For example, it can be beneficial to avoid opening a sealed chamber containing electrical components disposed in the wheel.

In some embodiments, a wheel assembly (also called a "wheel" herein) includes a serviceable tread assembly that is capable of being installed and attached to a non-serviceable housing assembly. As used herein, the term "serviceable" has its ordinary meaning and includes, without limitation, the characteristic of being intended to be replaced during the course of use of the item. As used herein, the term "non-serviceable" has its ordinary meaning and includes, without limitation, the characteristic of not intended to be replaced during the intended course of use of the item. For example, certain components of the wheel may be sealed (e.g., to inhibit contamination) and may be non-serviceable. Non-serviceable also includes situations where a component is not intended to be serviced by an end-user but which may be serviced by a factory-authorized technician or by the manufacturer. In certain instances, the wheel assembly is configured for use on a non-motorized vehicle. For example, the wheel assembly can be configured for use on a locking shopping cart wheel. In some embodiments, the tread assembly attaches to the housing assembly with one or more fastening devices (such as screws, bolts, nails, or otherwise) and/or locking features. In certain configurations, the fastening devices and/or locking features are arranged around the circumference of the tread assembly and/or the housing assembly.

Various embodiments include any one, or any combination of, the following features. In some embodiments, the tread assembly includes a tread and a frame (e.g., support, backbone, lattice, skeleton, spine, or other structural portion). In certain instances, the frame provides support and/or reinforcement for the tread. For example, in certain variants, the frame can be positioned radially inward of the tread and can be configured to bear force (e.g., compressive force) that is applied to the tread. In some implementations, the frame is configured to shape the tread (e.g., a generally cylindrical shape). In certain embodiments, the tread assembly couples with the housing assembly, which can include a hub and a cover. In some embodiments, installation of the tread assembly is facilitated by the structure of the hub and cover components. For example, the hub and cover components can be configured to allow the tread assembly to be slid onto the hub.

The wheel assembly can have any one, or any combination of, the following features. In certain embodiments, the tread assembly is held in position on the housing assembly by one or more fastening devices and/or locking features. In some cases, the fastening devices and/or locking features are integral with the tread assembly and/or the housing assembly. In certain embodiments, the fastening devices and/or locking features are axially arranged around the inside and/or outside surfaces of the tread assembly and correspond to mating features similarly arranged around the outer circumferential surfaces of the wheel assembly (e.g., the hub). As used herein, the term "axial," or derivations thereof, has its ordinary meaning and refers to, without limitation, a direction that is substantially perpendicular to a plane in which the wheel rotates. The axial direction may be substantially parallel to or substantially collinear with a rotation axis of the wheel (e.g., within ten to twenty degrees of the rotation axis). In some cases, the tread assembly is maintained on the housing assembly by one or more fasteners.

Certain embodiments include any one, or any combination of, the following features. In some embodiments, the tread assembly is configured to be removed from the housing assembly. In certain such cases, the tread assembly can be removed without the need to disassemble the housing assembly (e.g., by separating the hub and the cover). Such a configuration can, for example, facilitate easy replacement of the tread assembly (e.g., due to wear or damage) while preserving the integrity of the housing assembly. For example, a tread assembly that can be replaced without the need to open the housing assembly can maintain the efficiency of the seals on embodiments of the housing assembly that include such seals to protect components (e.g., electronics) located inside the housing assembly. In certain instances, removal of the worn or damaged tread is accomplished by the removal or disengagement of the fastening devices and/or locking features that secure the tread to the housing assembly. In some cases, the removal also includes axially sliding the tread off the mating wheel hub exterior geometry. A new tread assembly can be installed by reversing this procedure.

A wheel for a human-propelled cart can comprise a housing assembly having a hub and a cover. The hub can have an inner cavity and can comprise a frame engaging surface having a first mating feature, the inner cavity configured to receive an electrical component and the cover configured to be sealed with the hub, thereby inhibiting access into the inner cavity. In some embodiments, the wheel includes a tread assembly configured to axially receive a portion of the housing assembly, the tread assembly comprising a frame and a tread. The frame can have a tread engaging surface and a hub engaging surface, the hub engaging surface having a second mating feature and being configured to releasably couple with the frame engaging surface of the hub. The tread can be disposed radially outward of the frame and can be configured to engage a surface on which the wheel is configured to roll. The wheel can include a fastener configured to engage the first mating feature and the second mating feature. According to some variants, the tread assembly is configured to removably couple with the housing assembly such that the tread assembly can be axially separated from the housing assembly without unsealing the cover and the hub, thereby facilitating repair or replacement of the tread assembly while maintaining the seal of the cover and the hub. In some embodiments, when the hub engaging surface of the frame is coupled with the frame engaging surface of the hub, the first mating feature and the second mating feature are circumferentially aligned such that the fastener can axially engage the first mating feature and the second mating feature.

The wheel can include any one, or any combination of, the following features. In some embodiments, at least one of the first mating feature and the second mating feature comprises a radially outwardly-extending flange. The tread assembly can include a frame alignment feature comprising a first tread recess configured to receive the first mating feature. The housing assembly may include a hub alignment feature comprising a first housing recess configured to receive the second mating feature. In some embodiments, the wheel is configured to rotate around a rotation axis, and the hub is configured to be rotated relative to the frame about the rotation axis of the wheel. The frame alignment feature can include a second tread recess oriented substantially perpendicular to and extending generally circumferentially from the first tread recess, the second tread recess being configured to receive the first mating feature when the hub is rotated relative to the frame. The frame alignment feature can include a third tread recess extending in a direction generally axially away from the second mating feature, the third tread recess configured to receive the first mating feature when the hub is rotated relative to the frame such that the first mating feature is generally aligned with the third tread recess. In some embodiments, the hub alignment feature includes a second housing recess generally perpendicular to and extending generally tangentially from the first housing recess, the second housing recess configured to receive the second mating feature when the hub is rotated relative to the frame. The hub alignment feature includes a third housing recess extending in a direction generally axially away from the first mating feature, the third housing recess configured to receive the second mating feature when the hub is rotated relative to the frame such that the second mating feature is generally aligned with the third housing recess.

Certain embodiments include any one, or any combination of, the following features. In some embodiments, the tread assembly comprises a first rotational axis and the housing assembly comprises a second rotational axis, the first rotational axis and the second rotational axis being generally collinear when the housing assembly and tread assembly are coupled. The tread can have a tread width, the first mating feature and the second mating feature each can have an axial width that is less than the tread width, and the sum of the axial widths of the first mating feature and the second mating feature can be about equal to the tread width. In some embodiments, the human-propelled cart is a shopping cart.

A method of assembling a shopping cart wheel can comprise forming a housing assembly. Forming the housing assembly can include providing a hub having a central cavity, the hub comprising a first mating feature, axially joining a cover with the hub, the cover configured to form a seal between the cover and the hub, thereby inhibiting access by contaminants into the cavity, forming a tread assembly, wherein forming the tread assembly comprises, providing an annular frame comprising an inner surface and outer surface, the inner surface and the outer surface each comprising recesses, the inner surface further comprising a second mating feature, disposing a tread around at least the outer surface of the frame, and engaging the tread with the recesses on the inner surface and the outer surface of the frame, thereby securing the tread with the frame. In some embodiments, the method of assembling a shopping cart wheel includes aligning the first mating feature of the hub with the second mating feature of the frame, receiving the housing assembly into the tread assembly, and securing the housing assembly with the tread assembly.

Various embodiments have any one, or any combination of, the following. In some embodiments, securing the housing assembly with the tread assembly comprises positioning the first mating feature in a first recess of the frame, wherein the first mating feature comprises a radially outwardly extending flange, positioning the second mating feature in a second recess of the hub, wherein the second mating feature comprises a radially inwardly extending flange, and axially inserting a fastener through the first mating feature and the second mating feature. In some embodiments, the method of assembling a shopping cart wheel further comprises rotating the housing assembly and the tread assembly relative to each other after the housing assembly has been received into the tread assembly. The method of assembling a shopping cart wheel can further comprise axially spacing the first mating feature apart from the second mating feature.

A method of repairing a wheel of a shopping cart, the wheel comprising a housing assembly and a tread assembly coupled with a plurality of fasteners located generally around an outer circumferential region of the wheel, the housing assembly coupled with the shopping cart via a caster assembly, the housing assembly comprising a central sealed chamber that includes an electrical component, can comprise removing the wheel from the caster assembly. In some embodiments the method of repairing a wheel of a shopping cart includes loosening the fasteners such that the housing assembly and the tread assembly can be separated, separating the tread axially from the housing assembly without opening the central sealed chamber of the housing assembly, aligning first flanges of a replacement tread assembly with first recesses of the housing assembly, aligning second recesses of the replacement tread assembly with second flanges of the housing assembly, axially sliding the replacement tread assembly onto the housing assembly, securing the fasteners such that the fasteners couple the replacement tread assembly and the housing assembly, and coupling the housing with the caster assembly.

The method can include any one, or any combination of, the following. In some embodiments, loosening the fasteners comprises rotating the fasteners. The method of repairing a wheel of a shopping cart can further comprise rotating the tread assembly relative to the housing assembly after the replacement tread assembly has been axially slid onto the housing assembly. In some embodiments, the method of repairing a wheel of a shopping cart further comprising radially engaging the first flanges of a replacement tread assembly with the first recesses of the housing assembly, and radially engaging the second recesses of the replacement tread assembly with the second flanges of the housing assembly, thereby providing areas of radial interference between the housing assembly and the tread assembly.

In some embodiments, a wheel for a human-propelled cart includes a hub and a tread assembly. The hub can have a frame engaging surface having a first mating feature, such as a radially outwardly-extending flange. In some embodiments, the flange has a radially distal portion and a radially proximal portion. The radially distal portion can have a first circumferential width and the radially proximal portion can have a second circumferential width. In some variants, the first circumferential width is greater than the second circumferential width. In other variants, the first circumferential width is less than the second circumferential width.

The wheel can include any one, or any combination of, the following features. The tread assembly can be configured to axially receive a portion of the hub. In some implementations, the tread assembly has a frame and a tread. The frame can include a tread engaging surface and a hub engaging surface. The hub engaging surface can have a second mating feature. The second mating feature can include portions (e.g., recesses) shaped to correspond with the flange of the first mating feature. The second mating feature can be configured to releasably couple with the frame engaging surface of the hub. The tread can be disposed radially outward of the frame. The tread can be configured to engage a surface on which the wheel is configured to roll.

Various embodiments include any one, or any combination of, the following features. In some embodiments, when the hub engaging surface of the frame is coupled with the frame engaging surface of the hub, the first mating feature and the second mating feature are circumferentially aligned. For example, in certain such embodiments, a fastener can axially engage the first mating feature and the second mating feature.

In some embodiments, the wheel includes any one, or any combination of, the following features. Certain embodiments include a sealed inner cavity located in the hub with an electrical component located in the cavity. In some embodiments, the hub engaging surface of the frame further includes a radially inwardly-extending flange, and/or the hub further includes a radially inwardly-extending recess configured to receive the radially inwardly-extending flange. In some embodiments, at least one of the radially outwardly-extending flange of the hub and the radially inwardly-extending flange of the frame has a substantially frustoconical cross-sectional shape. In certain embodiments, the radially outwardly-extending flange of the hub and the radially inwardly-extending flange of the frame each have a substantially frustoconical cross-sectional shape. In some embodiments, the frame further comprises a radially extending spacer portion connecting a radially inward facing portion and a radially outward facing portion. The spacer portion can have an axial thickness in a direction substantially parallel to the axis of rotation of the tread assembly. The axial thickness of the spacer portion can be less than an axial thickness of the radially outward facing portion of the frame and/or less than an axial thickness of the radially inward facing portion of the frame. Some embodiments include a plurality of fasteners. Each of the plurality of fasteners can be configured to engage from a first axial side of the wheel. In various embodiments, the electrical component can comprise one or more of: a controller, a processor, a brake, a power source (e.g., a battery), and a transceiver for wireless RF communication (e.g., at a frequency of at least approximately 2.4 GHz, at least approximately 800 MHz and/or less than or equal to approximately 900 MHz, or otherwise).

According to certain embodiments, a wheel for a human-propelled cart includes a hub and a tread assembly. The hub can have an inner cavity. The inner cavity can be configured to receive an electrical component. The hub can include a frame engaging surface having a first mating feature. The tread assembly can be configured to axially receive a portion of the hub. The tread assembly can have a generally circular shape and an axis of rotation.

The wheel can have any one, or any combination of, the following features. The tread assembly can include an annular tread and a frame. The annular tread can be configured to engage a surface on which the wheel is configured to roll. The frame can be configured to engage with the annular tread. The frame can include a radially outward portion, radially inward portion, and/or radially-extending spacer portion. The radially outward portion can be configured to be received in the annular tread. The radially inward portion can have a hub engaging surface. The hub engaging surface can have a second mating feature. The hub engaging surface can be configured to releasably couple with the frame engaging surface of the hub. The radially-extending spacer portion can connect the radially inward portion and the radially outward portion. The spacer portion can have an axial thickness in a direction substantially parallel to the axis of rotation of the tread assembly. The axial thickness of the spacer portion can be less than an axial thickness of the radially outward portion of the frame and less than an axial thickness of the radially inward portion of the frame.

In various embodiments, the wheel includes any one, or any combination of, the following features. The frame can include one or more tread securement features that are configured to inhibit axial movement of the frame relative to the hub. The one or more tread securement features can include a locking flange. The locking flange can be adapted to engage a frame engagement feature of the hub when the hub is received in the tread assembly. This can inhibit movement of the hub relative to the frame in a direction substantially parallel to the axis of rotation of the tread assembly. The one or more tread securement features can include a radially-deflectable portion connected to the locking portion and to the radially inward portion of the frame. The radially-deflectable portion can include a frangible region. The frangible region can include a notch. Some embodiments include a plurality of fasteners. Each of the plurality of fasteners can be configured to engage from a first axial side of the wheel.

In some embodiments, a kit of parts for replacing wheels on a human-propelled cart includes an annular first tread assembly and an annular second tread assembly. The annular first tread assembly can include a first frame having a first inside surface and a first tread. The first tread can be engaged with and positioned radially outward of the first frame. The first tread can have a first outside surface. The annular second tread assembly can include a second frame having a second inside surface, second tread, and a spacer portion. The second tread can be engaged with and positioned radially outward of the second frame. The second tread can have a second outside surface. The spacer portion can extend radially between the second inside surface and the second outside surface. The first inside surface of the first frame can have a diameter that is substantially equal to a diameter of the second inside surface of the second frame. The first inside surface of the first frame and the second inside surface of the second frame can each be configured to receive and releasably engage with a common wheel hub assembly. The first outside surface of the first frame can have a diameter that is less than a diameter of the second outside surface of the second frame.

Some embodiments of the kit include any one, or any combination of, the following features. In various embodiments, the kit includes the wheel hub assembly. In some embodiments, the wheel hub assembly includes an inner chamber. In certain embodiments, the kit includes an electronic component positioned in the inner chamber. In some embodiments, the kit includes a cover that seals the electronic component from the ambient environment. In certain embodiments, the seal remains intact (e.g., the cover is not unsealed) during releasable engagement of the first frame with the wheel hub assembly and/or during releasable engagement of the second frame with the wheel hub assembly. In some embodiments, the electronic component comprises a brake mechanism, controller (e.g., processor and memory), transceiver, power supply (e.g., battery) or otherwise. The transceiver can be configured to transmit and/or receive radio frequency (RF) signals, such as signals at a frequency of at least approximately 2.4 GHz, at or between approximately 800 MHz and approximately 900 MHz, or otherwise.

The kit can include any one, or any combination of, the following features. According to some embodiments, a method of manufacturing a shopping cart wheel includes obtaining a hub having a central cavity. The hub can include a first mating feature with a radially distal portion and a radially proximal portion. The radially distal portion can be circumferentially greater than the radially proximal portion. Some variants of the method include obtaining a tread and an annular frame. The frame can include an inner surface and outer surface. At least one of the inner surface and the outer surface can include a plurality of engagement elements, such as recesses. The inner surface can have a second mating feature. Certain implementations of the method include securing the tread with the frame by disposing the tread around at least the outer surface of the frame, and/or engaging the tread with the plurality of engagement elements (e.g., recesses) on at least one of the inner surface and the outer surface of the frame. Some embodiments of the method include securing the frame with the hub by aligning the first mating feature of the hub with the second mating feature of the frame, and/or engaging the first mating feature of the hub with the second mating feature of the frame. In some embodiments, the method includes engaging a plurality of fasteners with the hub and the annular frame from a first axial side of the wheel.

In some embodiments, a method of assembling wheel assemblies for a human-propelled cart includes obtaining a first hub having an inner cavity configured to receive an electrical component. The method can also include obtaining a first tread assembly.

The method can include any one, or any combination of, the following. In some variants, obtaining a first tread assembly includes obtaining a first annular frame with one or more of: an inner radial portion having a first hub engaging surface, an outer radial portion having a tread engaging surface, and a spacing portion. The spacing portion can be positioned radially between and connected to the inner radial portion and the outer radial portion of the first annular frame. The spacing portion can have a radial thickness. In some variants, obtaining a first tread assembly includes engaging a first tread around at least the outer surface of the first annular frame. The first tread can have a first tread diameter. In certain implementations, the method includes receiving the first hub into the first tread assembly. In some embodiments, the method includes securing the first hub to the first tread assembly.

Various embodiments have any one, or any combination of, the following. Certain variants of the method include obtaining a second hub (e.g., a second hub having an outside diameter that is about equal to an outside diameter of the first hub) and obtaining a second tread assembly. In some embodiments, obtaining a second tread assembly includes obtaining a second annular frame having one or more of: an inner radial portion having a second hub engaging surface, an outer radial portion having a tread engaging surface, and a spacing portion. The spacing portion can be positioned radially between and connected to the inner radial portion and the outer radial portion of the second annular frame. The spacing portion can have a radial thickness that is different from the radial thickness of the spacing portion of the first annular frame. In some embodiments, obtaining a second tread assembly includes engaging a second tread around at least the outer surface of the second annular frame. The second tread can have a second tread diameter that is different from the first tread diameter. In some variants, the method includes receiving the second hub into the second tread assembly. In certain embodiments, the method includes securing the second hub to the second tread assembly.

Several embodiments (e.g., certain embodiments of the kit of parts) include any one, or any combination of, the following features. In some embodiments, the first annular frame includes one or more tread securement features. The one or more tread securement features can have a deflection portion and a locking portion. The deflection portion can be connected to the inner radial portion of the first annular frame. The locking portion can be connected to the deflecting portion. The locking portion can be adapted to interfere (e.g., present a physical stop) with a frame engagement feature of the hub when the hub is received within the first tread assembly. This can inhibit movement of the hub relative to the first annular frame in a direction substantially parallel to an axis of rotation of the first tread assembly. In some embodiments, the method includes engaging the locking portion of the one or more tread securement features of the first annular with the frame engagement feature of the hub. Certain embodiments of the method include deflecting the locking portion of the one or more tread securement features away from the frame engagement feature of the hub. In some variants, the method includes breaking (e.g., non-plastically deforming) the deflecting portion of the one or more tread securement features at a frangible point of the deflecting portion when the locking portion of the one or more tread securement features is deflected away from the frame engagement feature of the hub. In various embodiments, the deflecting portion is partially or completely separated from the remainder of the first annular frame. For example, the deflecting portion can detach from the first annular frame.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure. Indeed, this disclosure contemplates and includes that any feature, structure, or step disclosed herein can be replaced with or combined with any other feature, structure, or step disclosed herein, or omitted.

DETAILED DESCRIPTION

Non-motorized wheeled vehicles are used in a variety of environments including retail environments (e.g., shopping carts), manufacturing or warehouse environments (e.g., merchandise or industrial carts), travel environments (e.g., luggage or baggage carts at an airport or bus station), medical environments (e.g., hospital carts, medical device carts, wheelchairs, baby strollers), and so forth. Non-motorized vehicles are typically human-propelled, e.g., by a human pushing or pulling the vehicle. The present disclosure describes examples of wheels, treads, and methods for assembling wheels or replacing treads that are usable with non-motorized wheeled vehicles. Many of the examples described herein are in the context of wheels for shopping carts (also called shopping trolleys, supermarket trolleys, trolley carts, or otherwise); however, this is illustrative only and is not a limitation.

Figure 1:
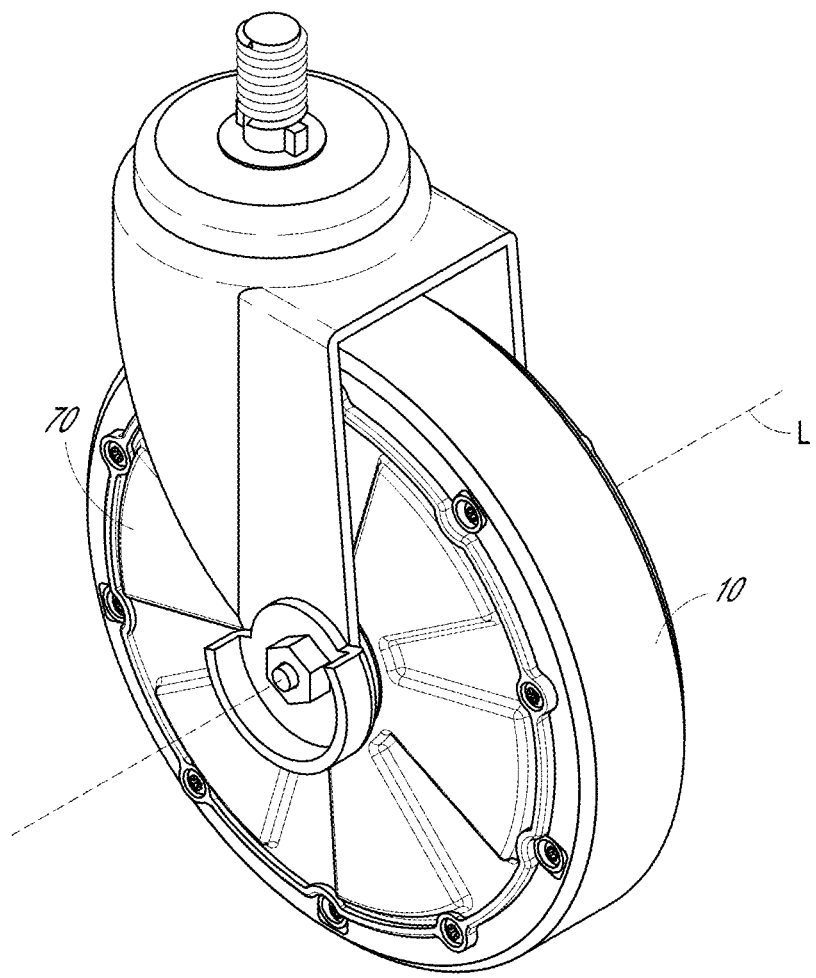
FIG. 1 illustrates a perspective view of an example of a wheel assembly for a cart, including examples of a tread assembly and a housing assembly.

With reference to FIG. 1, in some embodiments, a wheel assembly can include a tread assembly 10 and a housing assembly 70. The tread assembly 10 can be configured to mount or otherwise be received at least partly on the housing assembly 70. The tread assembly 10 can be configured to protect and/or space the housing assembly 10 from a surface on which the wheel assembly rolls. For example, the tread assembly 10 can protect the housing assembly 70 from abrasion due to contact with the surface.

Figure 2:
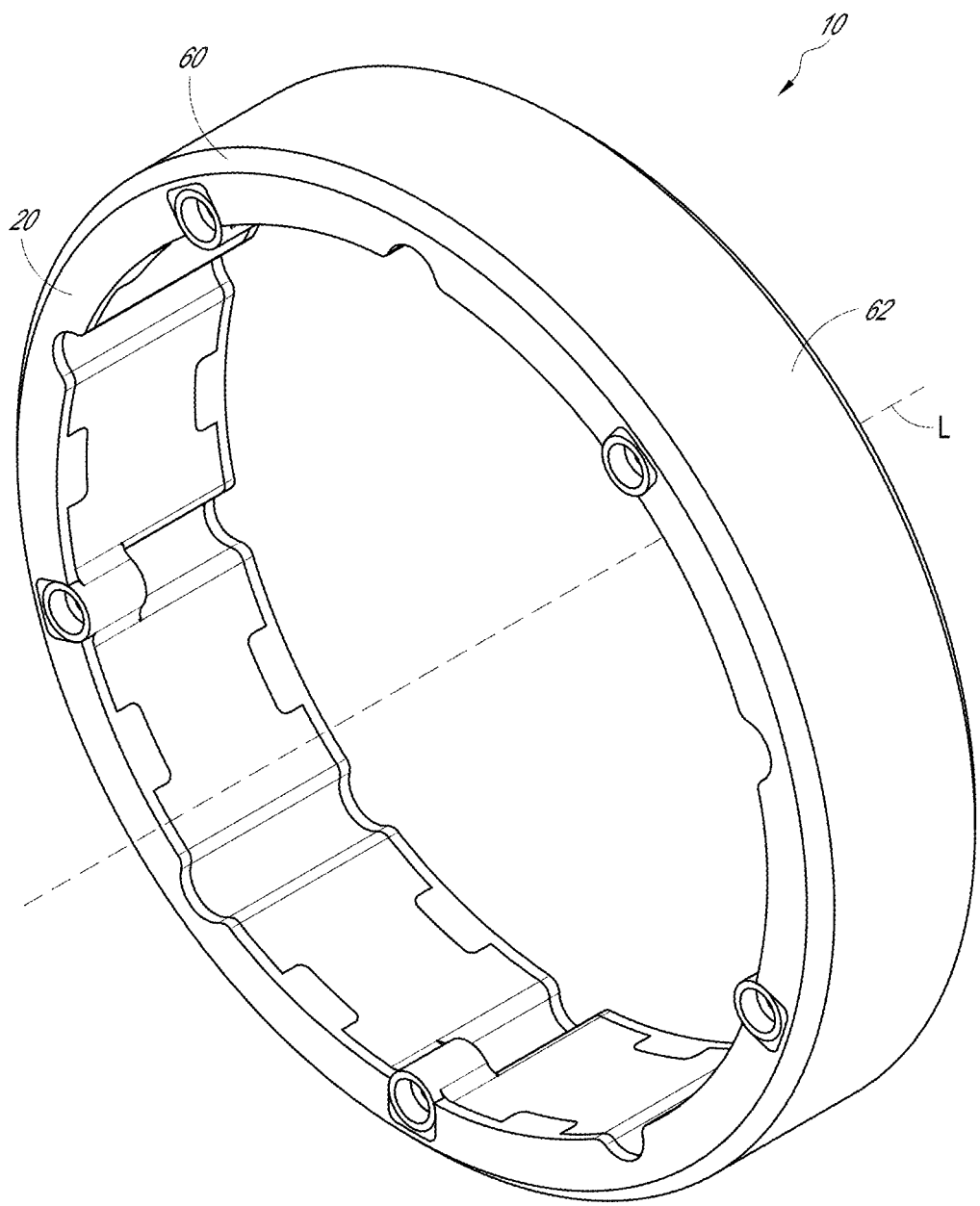
FIG. 2 illustrates a front perspective view of the tread assembly of FIG. 1.

With regard to FIGS. 1-5, an embodiment of a tread assembly 10 is illustrated. In some embodiments, the tread assembly 10 includes a frame 20 and a tread 60. In some embodiments, the frame 20 is generally rigid. In some cases, the frame 20 is made of metal (e.g., steel or aluminum) or a polymer (e.g., nylon). The frame 20 and/or tread 60 can include a rotational centerline. In some embodiments, as illustrated in FIG. 2, the rotational centerline L of the frame 20 is collinear with the rotational centerline of the tread 60 when the frame 20 is mated with the tread 60.

Figure 3:
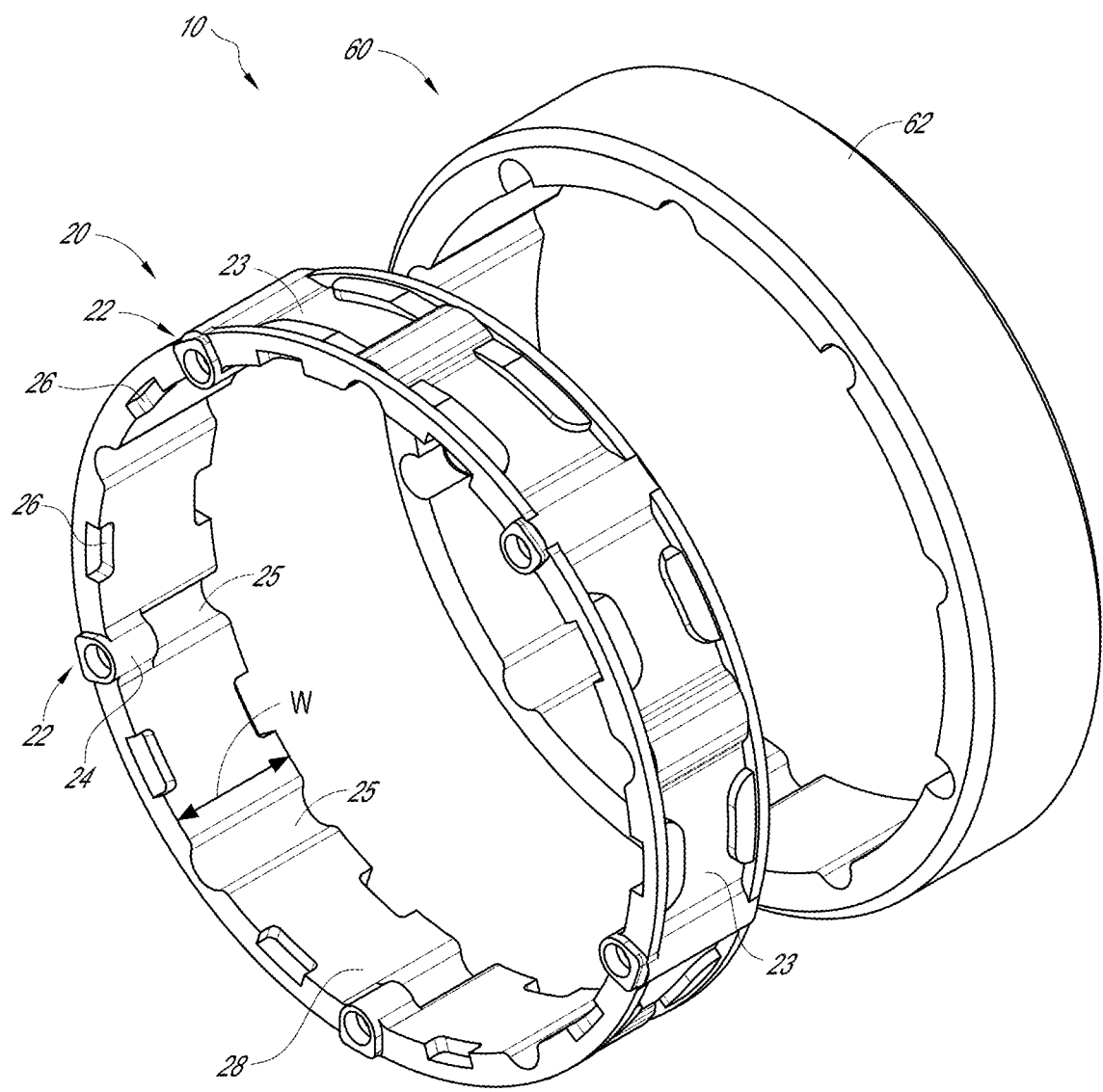
FIG. 3 illustrates an exploded view of the tread assembly of FIG. 1, including a tread and a frame.

As shown in FIG. 3, the frame 20 can be configured to engage with the tread 60. The frame 20 can have one or more recessed features 23. For example, in the embodiment illustrated, the frame 20 can include recessed features 23 that are arranged in a radial pattern around an outer circumference of the frame 20. As will be discussed in further detail below, the recessed features 23 can engage with corresponding features of the tread, thereby securing the frame 20 and the tread 60.

Figure 4:
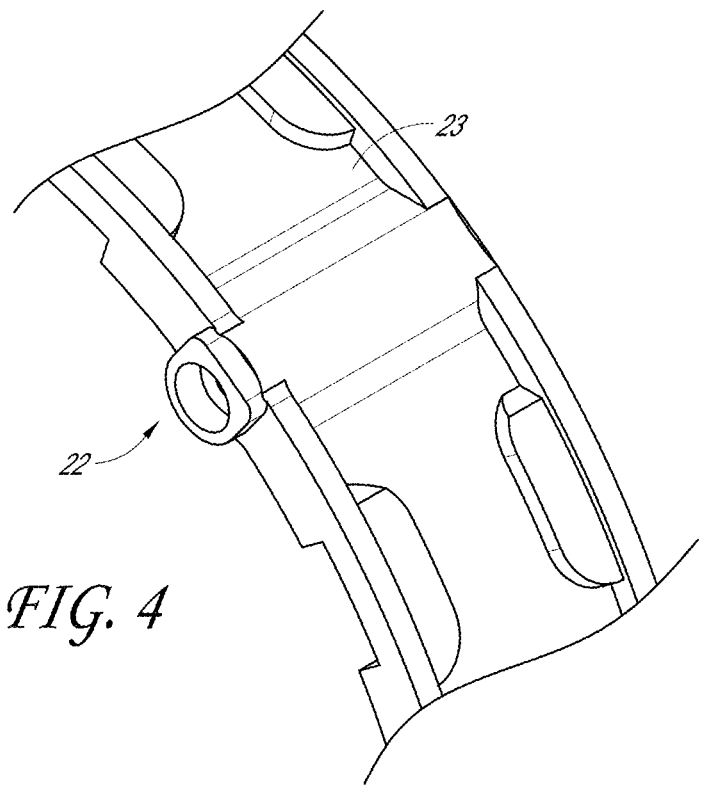
FIG. 4 illustrates a close-up view of a portion of the frame of FIG. 3.
Figure 5:
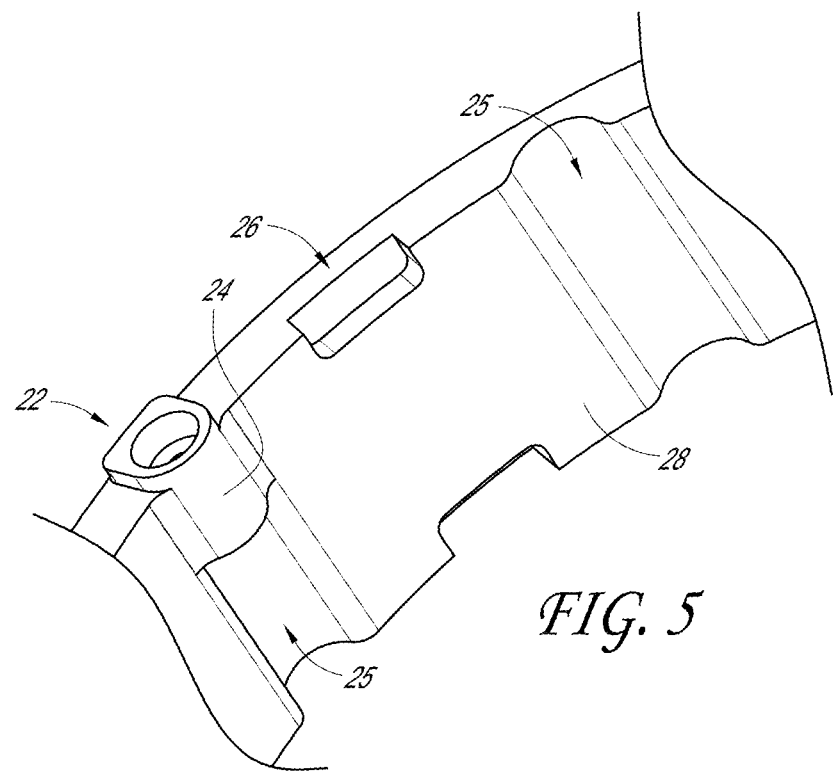
FIG. 5 illustrates another close-up view of a portion of the frame of FIG. 3.

According to some variants, the frame 20 includes a hub-engaging surface 28 located on the radially-inward surface of the frame 20. The frame 20 can include first mating features 22. In some embodiments, the first mating features 22 are located on the hub-engaging surface 28. In certain variants, such as is shown in FIGS. 3 and 4, the first mating features 22 can be one or more radially inwardly-extending flanges 24. In some embodiments, first mating features 22 are configured to allow for the insertion of a corresponding number of fasteners, such as one fastener per first mating feature 22. In the illustrated embodiment, the first mating features 22 are generally equally spaced in a radial pattern around an inner periphery of the frame 20. However, other configurations are contemplated and are included in this disclosure.

In some embodiments, the frame 20 includes indentations 25. In certain instances, the indentations 25 are arranged in a radial pattern around the inner circumference of the frame 20. One or more of the indentations 25 can span the axial (e.g., parallel to the rotational centerline of the frame) width W of the hub-engaging surface 28. In some embodiments, one or more of the indentations 25 are located axially-adjacent to the radially inwardly-extending flanges 24. In such embodiments, the first mating features 22 can comprise a radially inwardly-extending flange 24 and an indentation 25. The radially inwardly-extending flange 24 and corresponding indentation 25 can each have an axial width that is less than the axial width W of the hub-engaging surface 28.

The tread 60, or parts thereof, can be made of most any material, such as rubber, plastic, wood, metal, or otherwise. For example, the tread 60 can be a thermo-set material. The tread 60 can be molded onto, injected, fused, welded, or otherwise joined with the frame 20. In some cases, the tread 60 is formed separately from the frame 20 and then coupled with the frame 20. In other cases, the tread 60 is formed with the frame 20. For example, the frame 20 can be molded during substantially the same operation (e.g., injection molding operation) as the tread 60. In certain instances, the tread 60 covers all exposed outside surfaces of the frame 20. In some embodiments, the tread 60 is injection molded onto the frame 20. In certain cases, the tread 60 is secured with/to the frame 20 by adhering with the indentation features 23.

In some implementations, the tread 60 engages with recesses 26 on the frame 20. For example, the tread 60 can extend around a portion of the sidewall of the frame 20, such that the tread 60 is located radially outward of the frame 20 and a portion of the tread 60 is engaged with the recess 26. In certain variants, the tread 60 wraps around a portion of the frame 20. In certain instances, the tread 60 is joined with the frame 20 with an adhesive (e.g., glue or epoxy), thermal or sonic welding, or otherwise. For example, an adhesive can be applied to an outer surface of the frame 20 and/or an inner surface of the tread 60. In some embodiments, the outer surface (e.g., tread-engaging surface) of the frame 20 and/or an inner surface (e.g., structure-engaging surface) of the tread 60 can be textured (e.g., dimpled, ribbed, grooved, or otherwise), which can facilitate a connection between the frame 20 and the tread 60.

The tread 60 can include a traction surface 62 configured to engage with a floor or other surface when the non-motorized vehicle (e.g., a shopping cart) is moved. The traction surface 62 can be constructed of the same material as the tread 60 or from a difference material. In some embodiments, the traction surface 62 includes friction features (e.g., channels, protrusions, etc.) configured to facilitate grip between the traction surface 62 and the floor on which it is resting.

With regard to FIGS. 6-9, an embodiment of a housing assembly 70 is illustrated. As shown, the housing assembly 70 can include a structural hub 80 and a cover 90. In certain embodiments, the hub 80 and the cover 90 can be assembled together. For example, the hub 80 and cover 90 can be held together by fasteners 50, which can be arranged in a radial pattern around the circumference of the hub 80 and/or cover 90. In some embodiments, the fasteners 50 engage with radially outwardly-extending flanges 84, 94 on the hub 80 and cover 90 respectively. For example, one or more flanges 94 on the cover 90 can be aligned with one or more flanges 84 on the hub 80 such that a fastener 50 can be extended through apertures in the aligned flanges 84, 94. In some embodiments, the flanges 94 on the cover 90 are symmetrically distributed about the outer circumference of the cover 90. In some such embodiments, the cover 90 can be attached to the hub 80 in a plurality of relative rotational orientations. In some embodiments, the flanges 94 are asymmetrically distributed about the outer circumference of the cover 90 such that the cover 90 connects with the hub 80 in only one relative rotational orientation. In some such embodiments, rotational alignment of some portion of the hub 80 and/or the contents therein can be consistently aligned with some portion of the cover 90. In some embodiments, the hub 80 and/or cover 90 can include one or more magnets housed within and/or on the surface of the hub 80 and/or cover 90 (e.g., magnets for use with Hall effect sensors to activate the electrical components within or around the housing assembly 70).

In some instances, the hub 80 and/or the cover 90 include second mating features 82. The second mating features 82 can correspond to the features 22 on the inside of the frame 20 of the tread assembly 10. The illustrated embodiment includes a plurality of second mating features 82 arranged in a radial pattern around the outer circumference of the housing assembly 70. Other configurations are also contemplated and are part of this disclosure. In some instances, the second mating features 82 include radially outwardly extending flanges 84. In some instances, the second mating features 82 include radially inwardly extending notches 85. In some instances, such as in the illustrated embodiment, the second mating features 82 include a combination of radially outwardly extending flanges 84 and radially inwardly extending notches 85.

As shown, the housing assembly 70 can have an axial depth D. In some cases, the second mating features 82 extend less than the entire axial depth D of the housing assembly 70. In other cases, the second mating features 82 can extend less than the entire axial depth D of the housing assembly 70. Such a configuration can, for example, provide an improved connection between the housing assembly 70 and the tread assembly 10 when assembled together, as is discussed below. In some implementations, the depth D of the housing 70 is greater than or equal to the axial width W of the frame 20.

Figure 6:
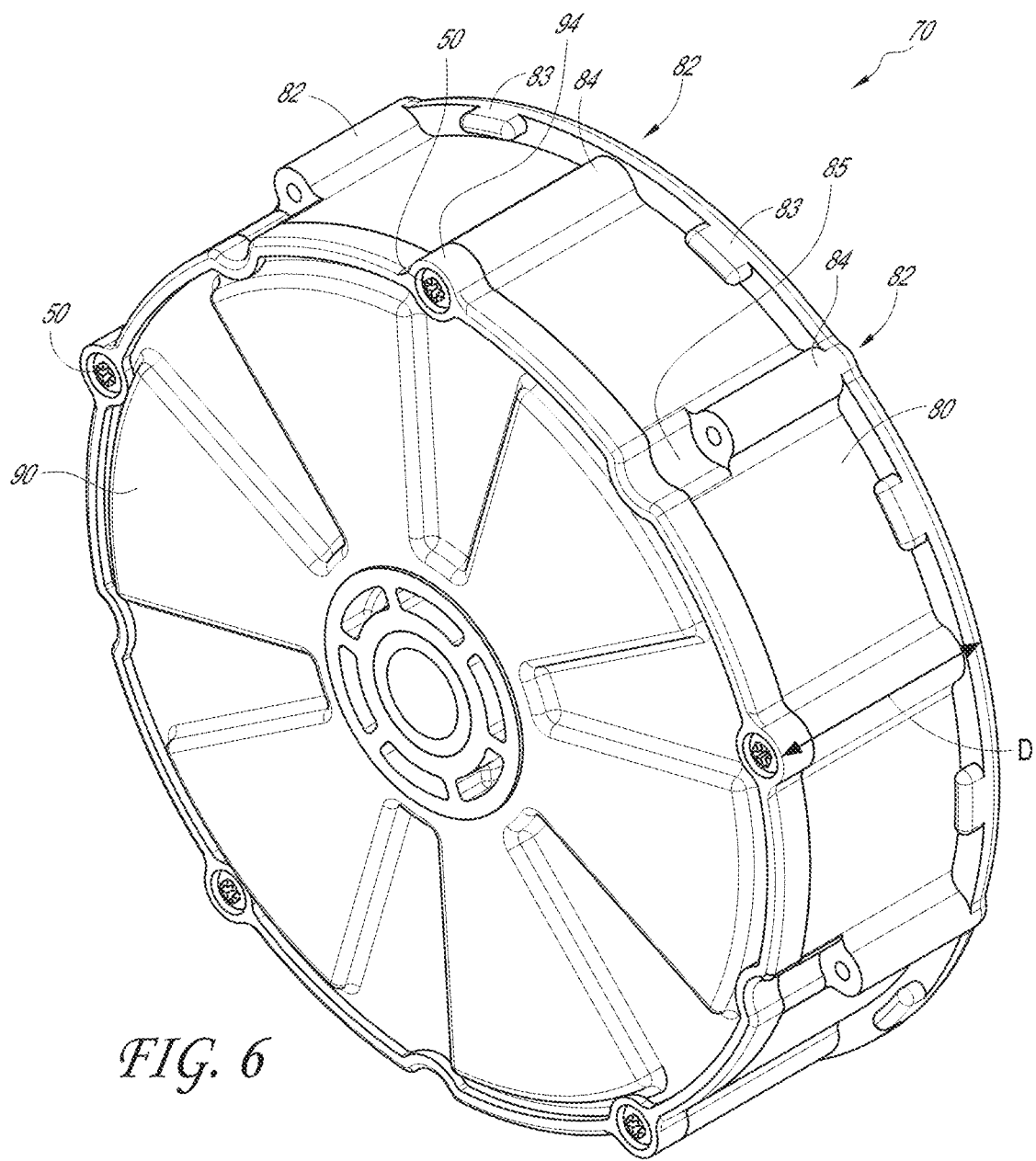
FIG. 6 illustrates an embodiment of the housing assembly of FIG. 1, including a hub and a cover.
Figure 6A:
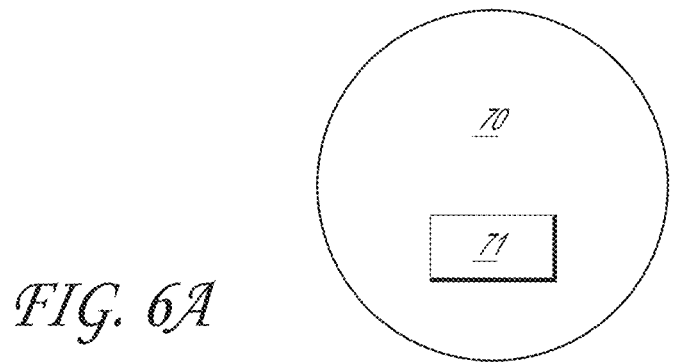
FIG. 6A schematically illustrates a device disposed inside the housing assembly of FIG. 6.
Figure 7:
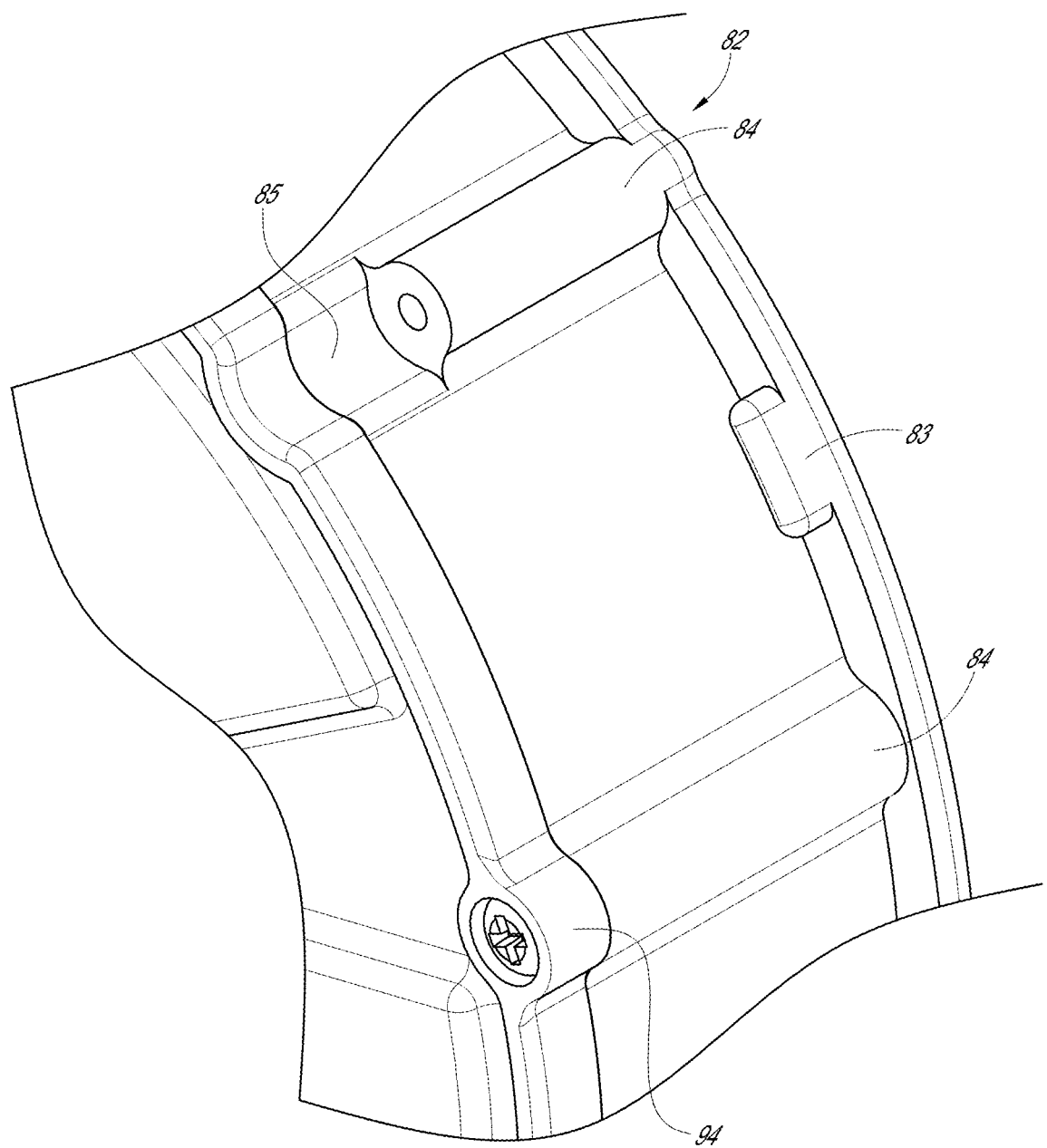
FIG. 7 illustrates a close-up view of a portion of the housing assembly of FIG. 6.
Figure 8:
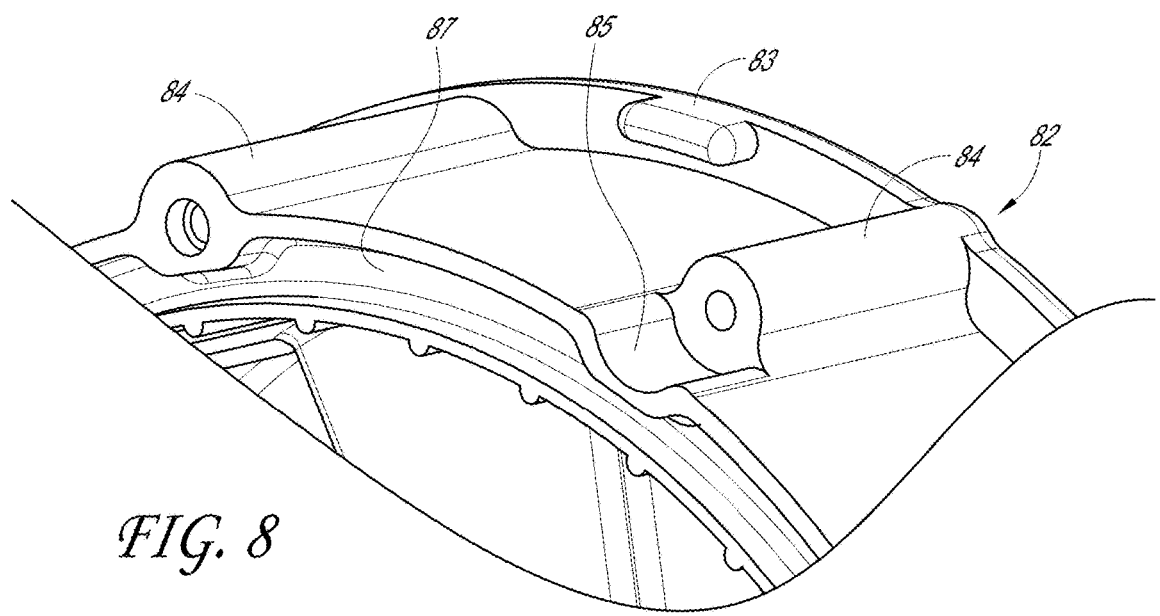
FIG. 8 illustrates a close-up view of a portion of an embodiment of the hub of FIG. 6.

In some embodiments, the cover 90 and the hub 80 include rib features 97 and 87 that form a mating channel structure around the inside circumference of the cover 90 and the hub 80. The rib features 97 and 87 can house a seal (e.g., a rubber or polymeric O-ring), which can be configured to inhibit or prevent moisture or other contaminants from entering the inside of the housing assembly 70 when the hub 80 is assembled with the cover 90. Such a configuration can, for example, protect devices 71 (e.g., mechanical or electrical components) disposed inside the housing assembly 70, such as is schematically shown in FIG. 6A. Examples of such devices can include, for example, a brake mechanism, a two-way communication device, a navigation device, a power generator, a computer processor, a battery, combinations of such devices, or otherwise. Examples of some such devices are discussed in the following: U.S. Pat. No. 8,046,160, titled "NAVIGATION SYSTEMS AND METHODS FOR WHEELED OBJECTS"; U.S. Patent Application Publication No. 2006/0244588, filed Mar. 20, 2006, titled "TWO-WAY COMMUNICATION SYSTEM FOR TRACKING LOCATIONS AND STATUSES OF WHEELED VEHICLES"; and U.S. Patent Application Publication No. 2006/0249320, filed Mar. 20, 2006, titled "POWER GENERATION SYSTEMS AND METHODS FOR WHEELED OBJECTS;" the entirety of each of which is hereby incorporated by reference herein.

In certain variants, the cover 90 and the hub 80 are configured to be readily separable from each other. For example, in some implementations, the cover 90 and the hub 80 are configured to be separable after the fasteners 50 are removed. Designs including a separable cover 90 and hub 80 can, for example, facilitate the ability to service, replace, repair, and/or otherwise attend-to the devices in the housing assembly 70. For example, such designs can facilitate installing a new battery in the housing assembly 70. Some embodiments have an O-ring or other type of sealing device disposed between, near, or adjacent to the rib features 97 and 87.

In some variants, the cover 90 and the hub 80 are substantially permanently joined. For example, in some embodiments, the channel structure can be at least partly filled with an adhesive (not shown) that, in combination with the surfaces formed by rib features 97 and 87, substantially permanently joins the cover 90 and the hub 80. In some embodiments, the adhesive forms a portion of the seal between the cover 90 and the hub 80. Further, in some such embodiments, the adhesive can inhibit or otherwise discourage disassembly of the housing assembly 70.

Certain embodiments that have substantially permanently joined cover 90 and hub 80 have a longer life expectancy than embodiments in which the cover 90 and the hub 80 are readily separable. For example, embodiments in which the cover 90 and the hub 80 are substantially permanently joined can include a battery having a greater life expectancy, an internal generator and power storage (such as is described in U.S. Patent Application Publication No. 2006/0249320, incorporated by reference herein), and/or intelligent power management circuits utilizing motion sensors, each of which, alone or in combination, can provide a longer life than embodiments in which the cover 90 and the hub 80 are readily separable.

Figure 9:
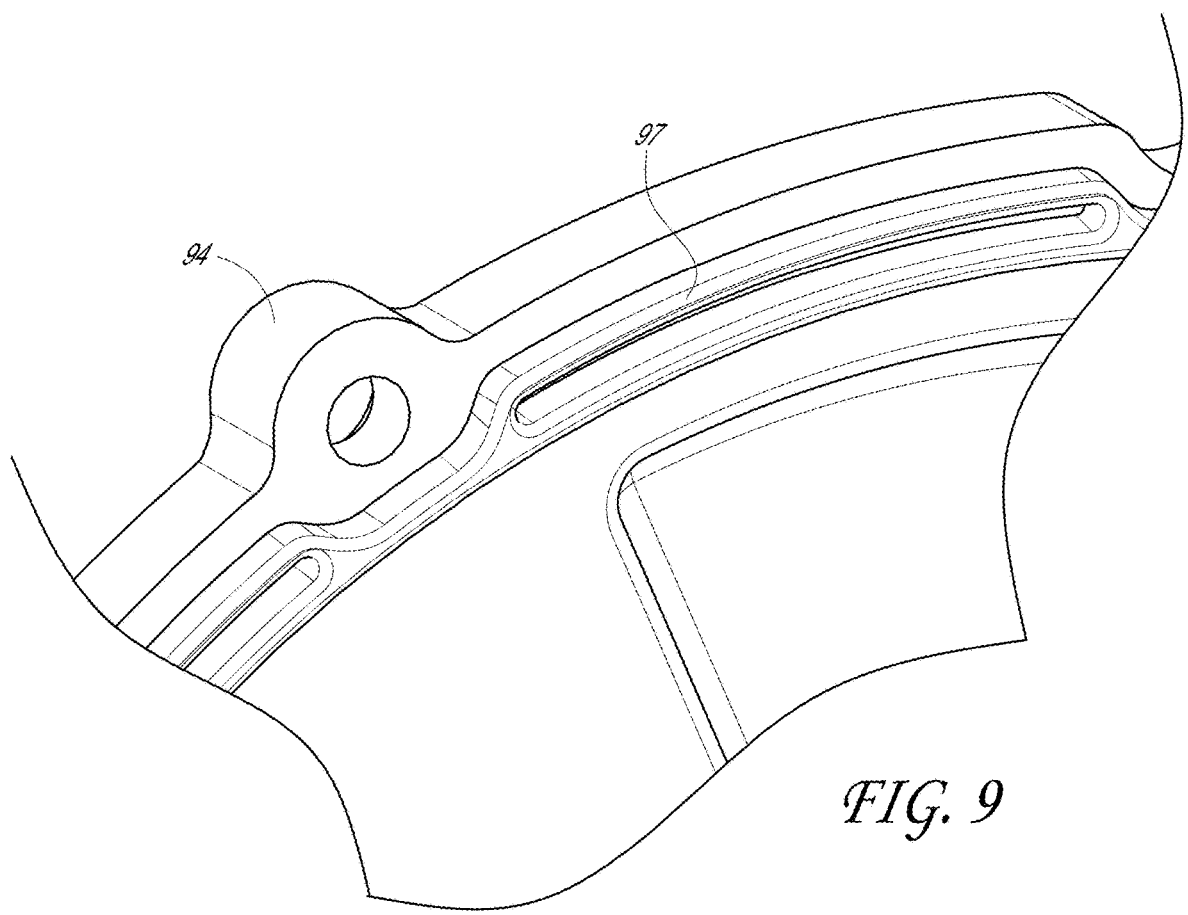
FIG. 9 illustrates a close-up view of a portion of an embodiment of the cover of FIG. 6.
Figure 10:
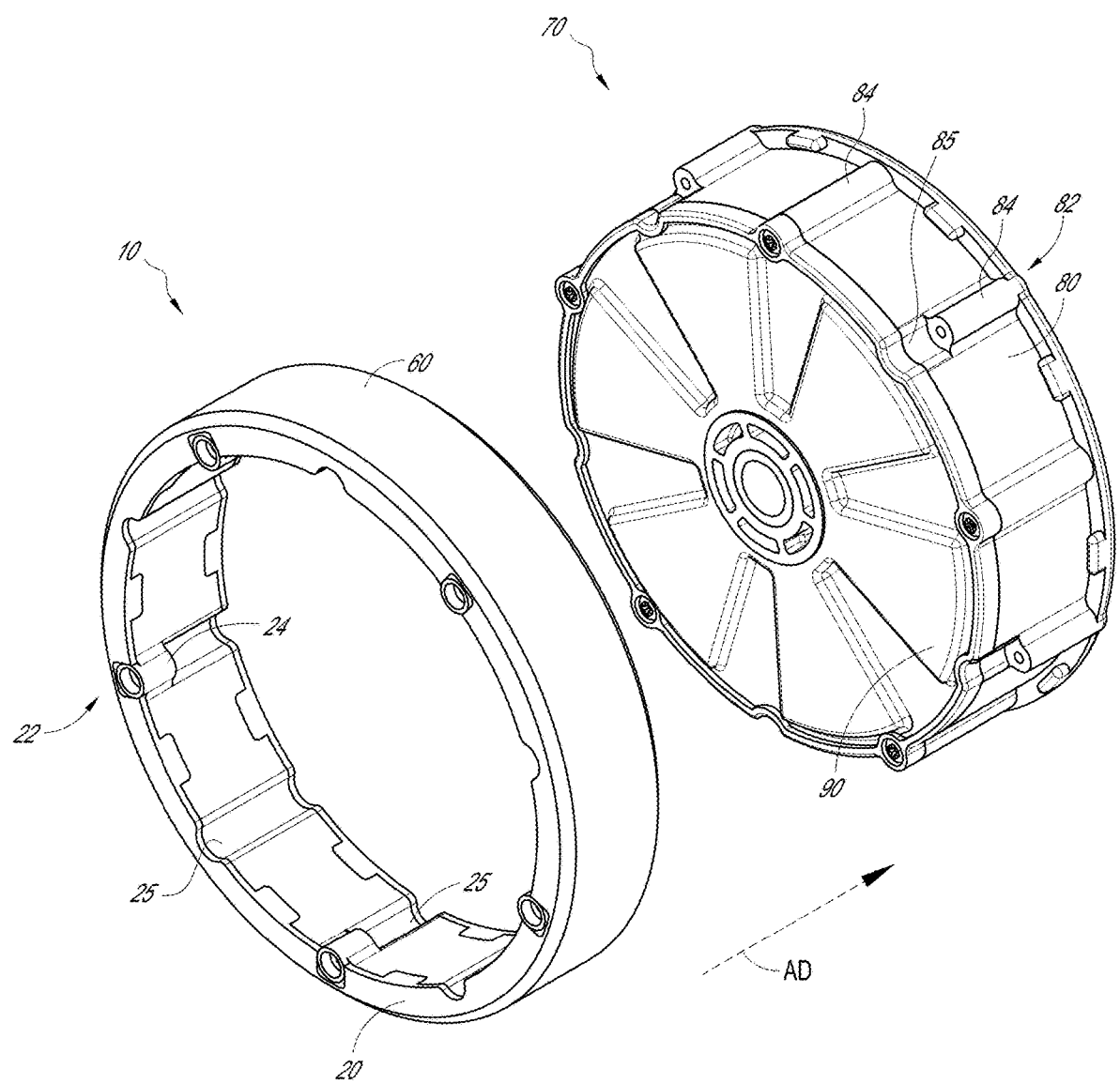
FIG. 10 illustrates an exploded view of an embodiment of the wheel assembly of FIG. 1, including the tread assembly of FIG. 2 and the housing assembly of FIG. 6.
Figure 11:
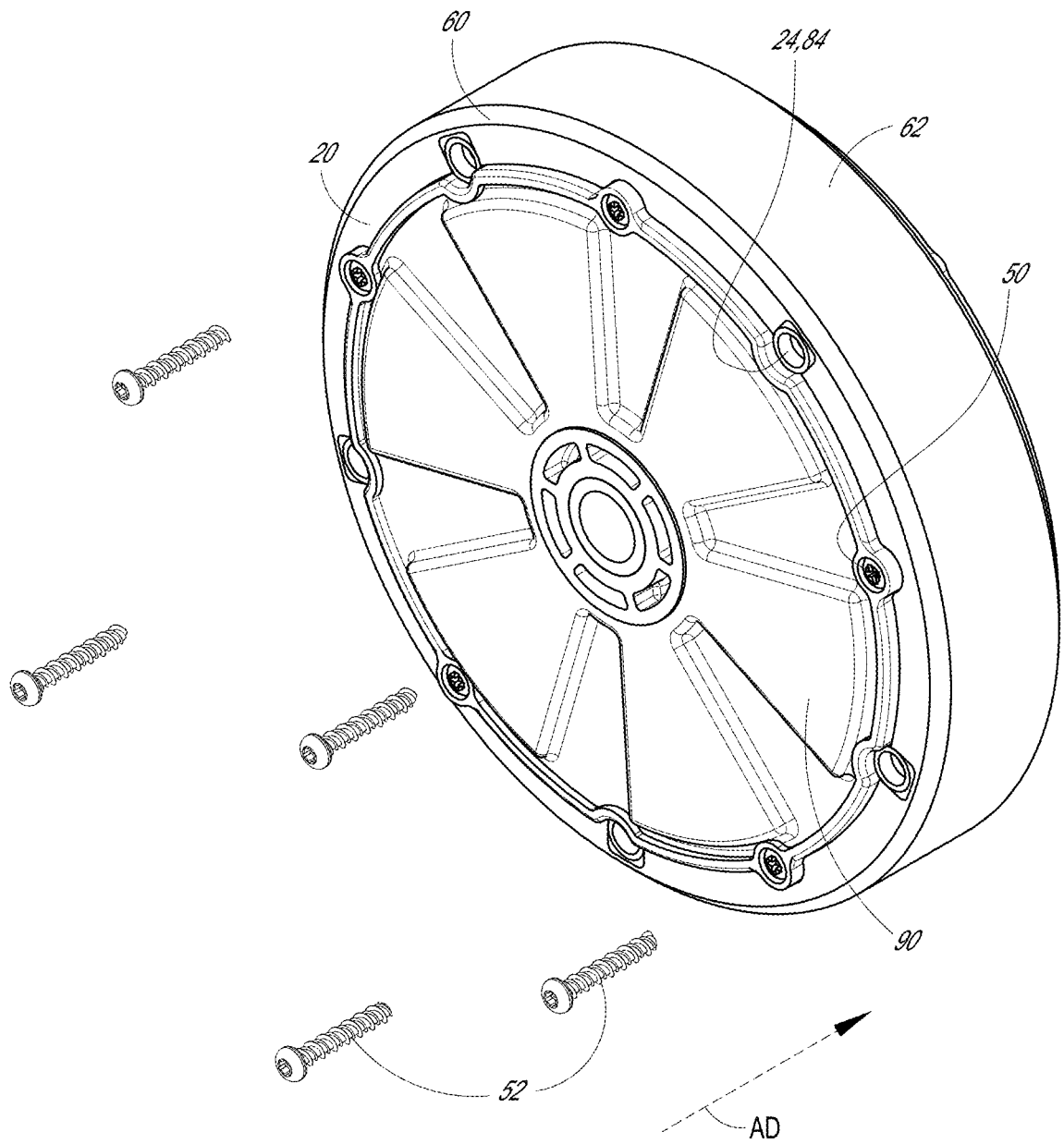
FIG. 11 illustrates the wheel assembly of FIG. 10 in a partially assembled state, with the tread assembly coupled with the housing assembly, and a plurality of fasteners in an exploded view.

As shown in the exploded views of FIGS. 9-11, the tread assembly 10 can be installed on the housing assembly 70. For example, the first mating features 22 of the frame 20 can be aligned with the second mating features 82 of the cover 80 and hub 90 of the housing assembly 70. In certain embodiments, the tread assembly 10 can be axially slidably mounted on the housing assembly 70 when the tread assembly 10 and housing assembly 70 are moved toward one another in an axial direction AD. In certain such embodiments, the first mating features 22 can be received in the radially inwardly extending notches 85 of the housing assembly 70, thus providing a circumferential interference, which can inhibit or prevent the tread assembly 10 from rotating relative to the housing assembly 70. In some embodiments, the flanges 84 are received into the indentations 25 of the frame 20 to provide additional or alternative circumferential interference between the housing assembly 70 and the tread assembly 10. The first mating features 22 and second mating features 82 can be circumferentially distributed in a symmetric pattern such that the tread assembly 10 can align with the housing assembly 70 in a plurality of relative rotational orientations. In some embodiments, the first mating features 22 and second mating features 82 are asymmetrically circumferentially distributed such that the tread assembly 10 and housing assembly 70 can align in only one relative rotational orientation. In some such embodiments, alignment between certain features (e.g., sensors, mechanical components, electrical components, etc.) within the housing assembly 70 and certain features of the tread assembly 10 can be facilitated.

Figure 2A:
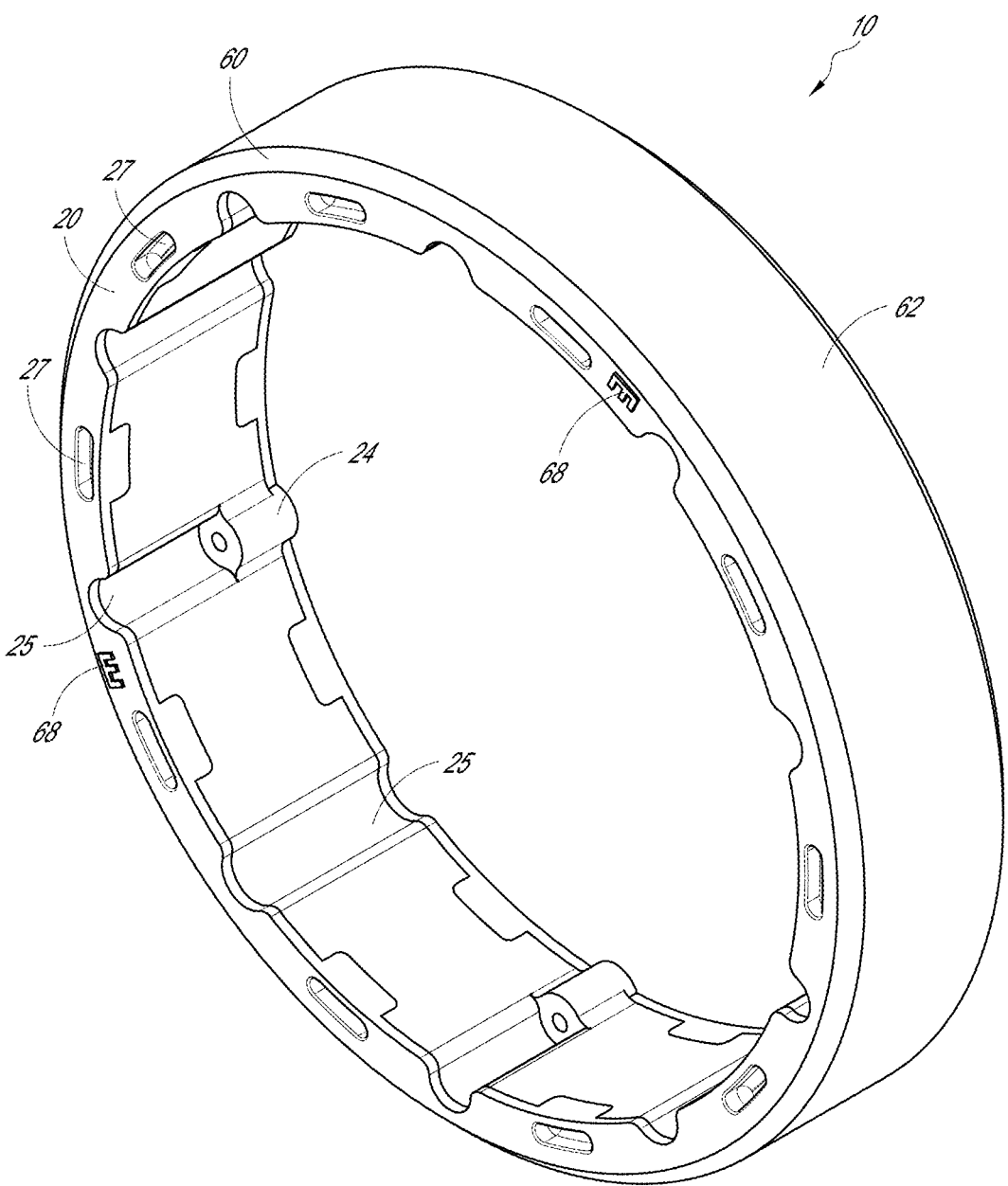
FIG. 2A illustrates a rear perspective view of the tread assembly of FIG. 1.

In some embodiments, as illustrated in FIG. 2A, the tread 60 and/or frame 20 can include one or more mating identifiers 68. The mating identifiers 68 can facilitate proper orientation of the tread assembly 10 with respect to the housing assembly 70 for connecting the tread assembly 10 to the housing assembly 70. For example, mating identifiers 68 can be located on the side of the tread 60 that faces the housing assembly 70 before the tread assembly 10 is received onto the housing assembly 70. In some embodiments, the mating identifiers 68 correspond to the side of the tread assembly 10 opposite the inwardly-extending flanges 24.

In some embodiments, the tread assembly 10 is secured with the housing assembly 70 with fasteners 52 in order to, for example, reduce the chance of unintentional separation and/or to reduce vibration. In some configurations, the housing assembly 70 and/or the tread assembly 10 include indicia to indicate the fasteners 52 that couple the housing assembly 70 with the tread assembly 10. In certain instances, at least one of the fasteners 52 is configured to discourage tampering with the wheel assembly. For example, at least one of the fasteners 52 can have a non-standard screw driving connection (e.g., a tamper-resistant head). The fasteners 52 can be installed into the tread assembly 10 and housing assembly along the axial direction AD.

In some embodiments, a method of installing a tread assembly 10 includes sliding the tread assembly 10 onto the housing assembly 70. In certain instances, the tread assembly 10 is slid until it is generally fully seated on the housing assembly 70 (e.g., in contact with a positive stop or other feature to denote proper placement). The hub 80 can include one or more hub orientation features 83, such as one or more protrusions 83 or recesses. In some such embodiments, the tread 60 and/or frame 20 can include one or more tread orientation features 27 (e.g., protrusions and/or recesses) configured to engage with the one or more hub orientation features 83. Engagement between the tread orientation features 27 and the hub orientation feature 83 can facilitate alignment between the first mating feature 22 and the second mating feature 82. In some cases, the tread assembly 10 is axially installed (e.g., by sliding) onto the housing assembly 70. In some embodiments, the method includes securing the tread assembly 10 to corresponding features on the hub 80 with fasteners 52. According to some variants, the tread assembly 10 can be connected with and disconnected from the housing assembly 70 without unsealing the housing assembly 70 (e.g., without removing the cover 90 from the hub 80).

Figure 12:
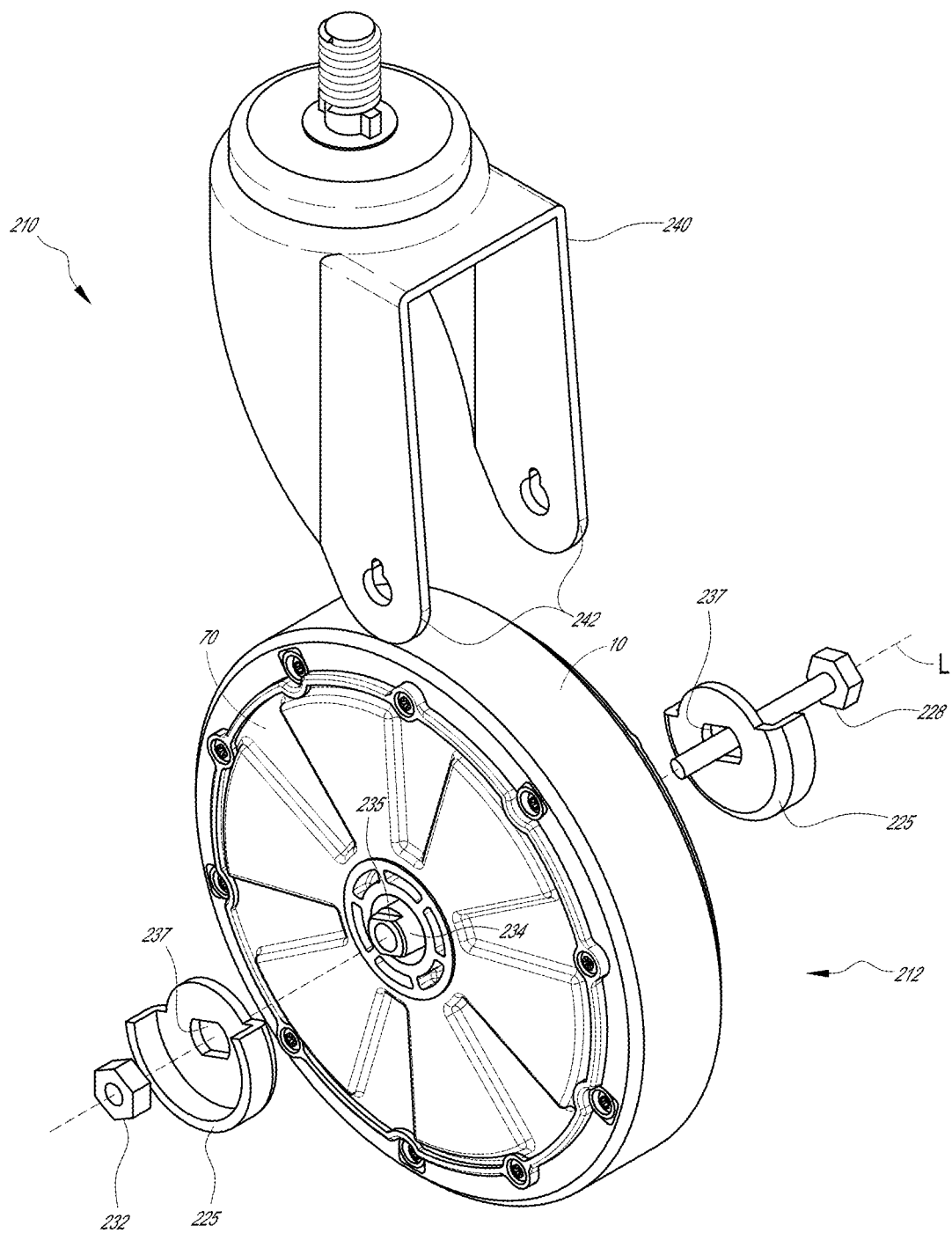
FIG. 12 illustrates the wheel assembly of FIG. 11 in an assembled state, with a caster and associated hardware shown in an exploded view.
Figure 13:
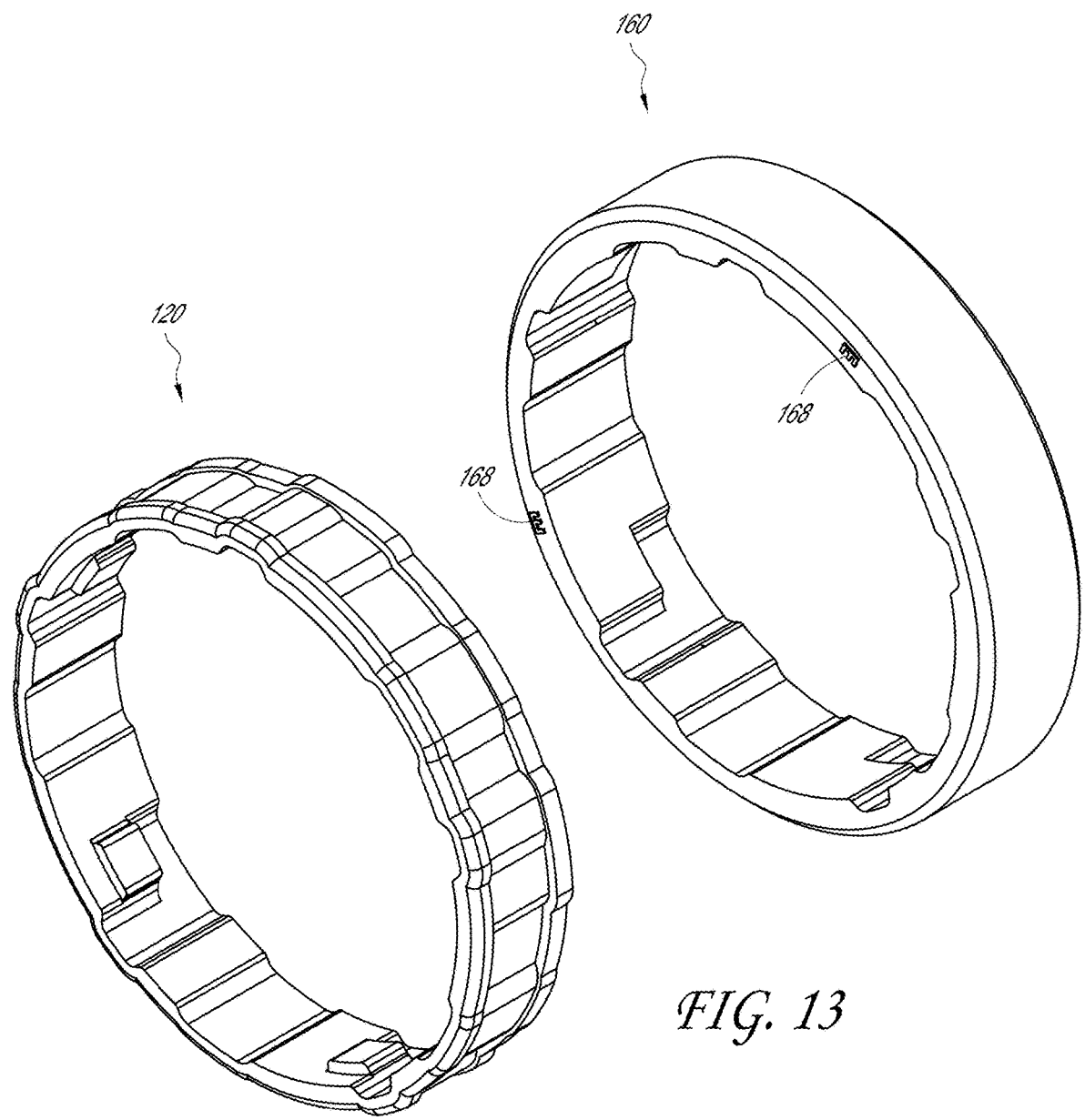
FIG. 13 illustrates an exploded view of another embodiment of a tread assembly, including a frame and a tread.

In certain embodiments, the method further includes mounting the wheel assembly with a caster 240, for example as shown in FIG. 12. In certain embodiments, the method also includes placing the wheel assembly between end portions 242 of the caster 240; placing a first fastener 228 (e.g., a bolt) through the end portions 242 and the wheel assembly; and securing the first fastener 228 with a second fastener 232 (e.g., a nut). In certain instances, the method also includes mating at least one flat portion 234 of an axle 243 of the wheel assembly with a retaining clip 225. In certain such cases, the method also includes inhibiting rotation of the axle 234. For example, rotation of the axle 234 can be inhibited by an interference fit between the "U"-shaped side of the retaining clip 225 and at least one of the end portions 242 of the caster 240.

In some embodiments, a method of removing a tread assembly 10 includes substantially the reverse of some of the actions in the above-described method of installing a tread assembly 10. For example: separating the wheel assembly from the caster 240 (e.g., by loosening fastener 228, 232 and removing the fastener 228), loosening the fasteners 52, and axially sliding the tread assembly 10 off of the housing assembly 70.

In some embodiments, a method of manufacturing a tread assembly 10 includes forming a frame 20 and molding a tread 60 onto the frame 20. Some embodiments include vulcanizing the tread 60. In some cases, the method includes applying an adhesive to an outer surface of the frame 20, which can, for example, improve adherence of the tread 60 with the frame 20.

Figure 14:
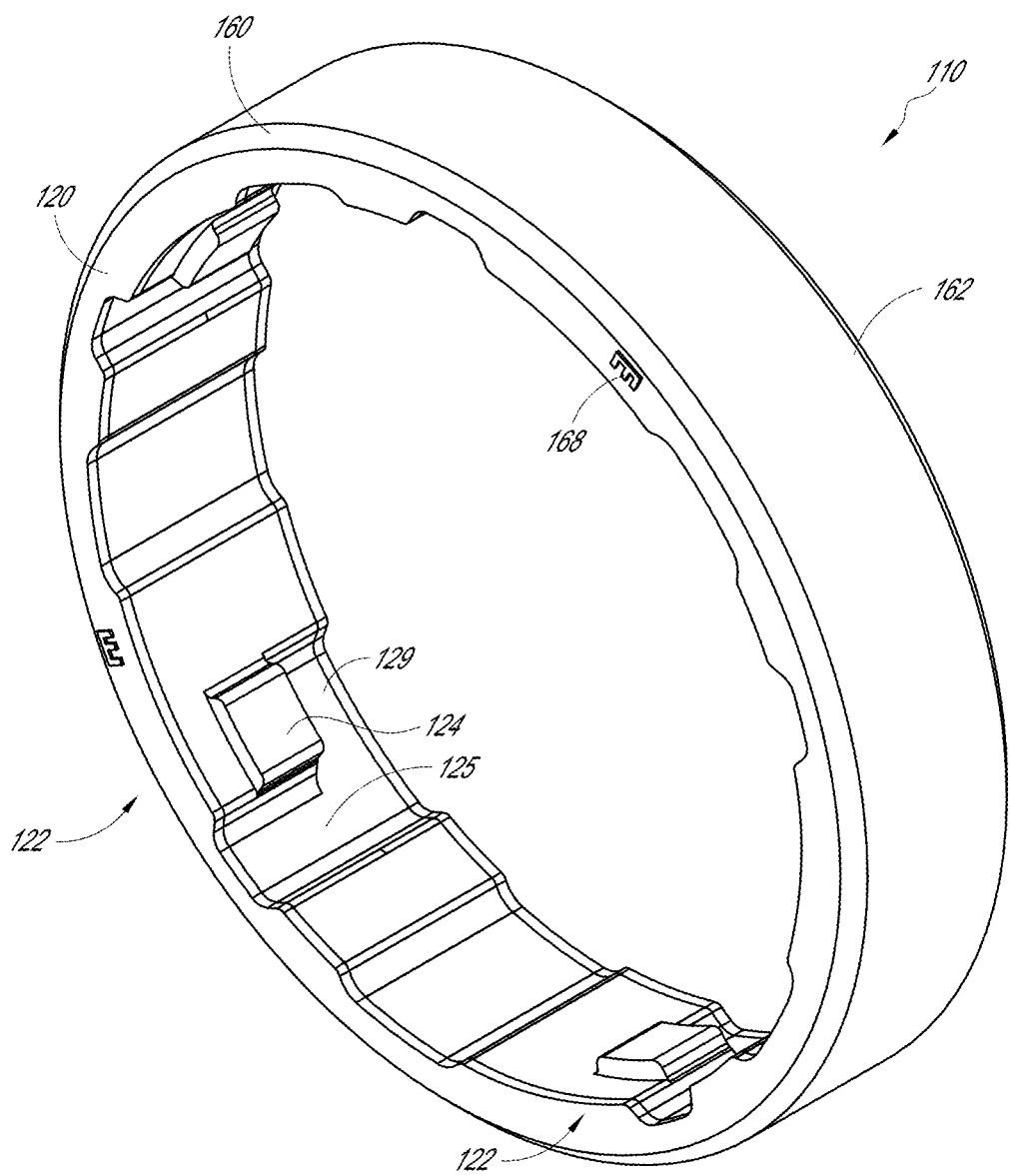
FIG. 14 illustrates the tread assembly of FIG. 13 in an assembled state.

With regard to FIGS. 13-22, another embodiment of a tread assembly is illustrated. In some embodiments, the tread assembly 110 includes a frame 120 and a tread 160. Certain embodiments of the frame 120 are nylon and are injection molded. In some embodiments, the tread 160 is rubber (e.g., ethylene propylene diene monomer (EPDM)). Certain variants of the tread 160 can be over-molded onto the insert ring 120. As shown in FIG. 14, in the assembled tread 110, the tread 160 can be positioned generally outside and around the frame 120. For example, the frame 120 can be received in the tread 160.

Figure 15:
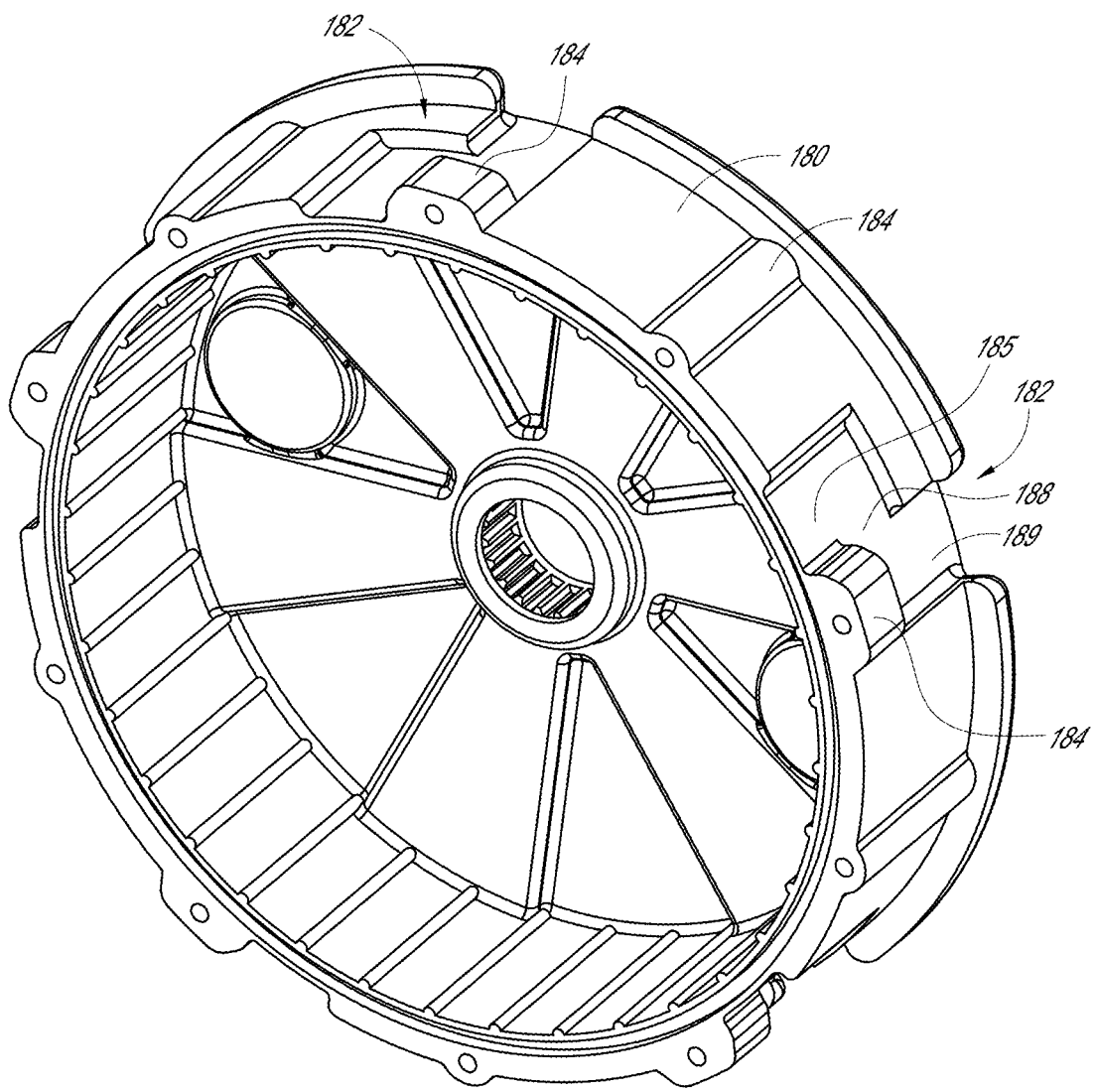
FIG. 15 illustrates an embodiment of a wheel hub assembly.
Figure 16:
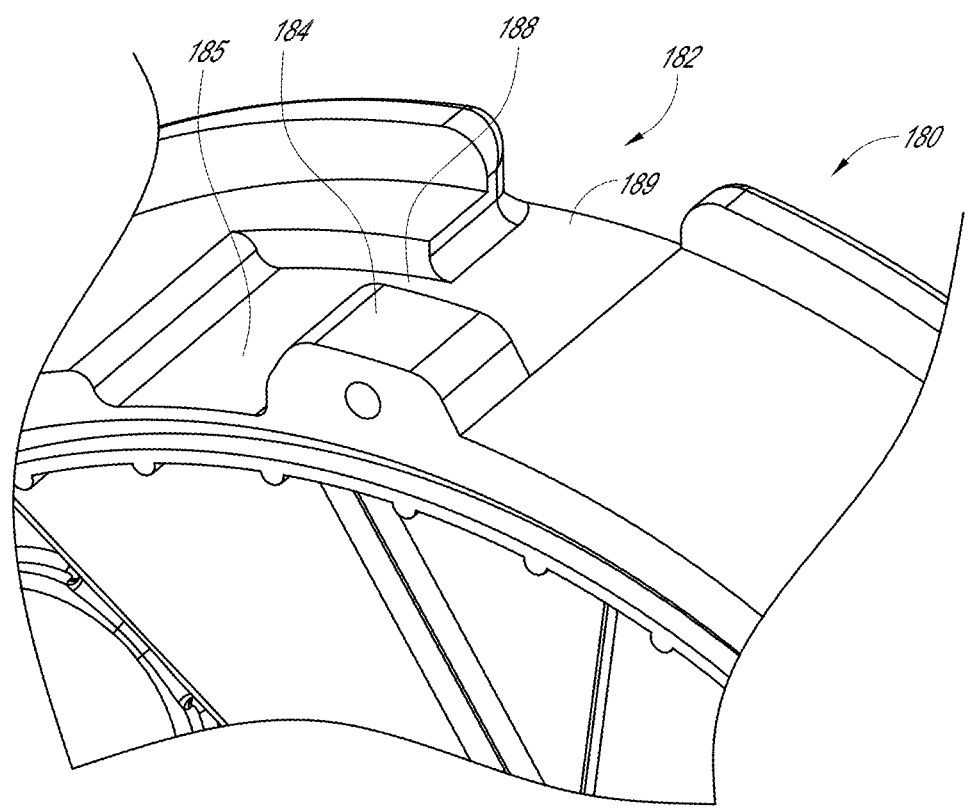
FIG. 16 illustrates a close-up view of the hub assembly of FIG. 15.

As illustrated in FIGS. 14-16, in certain implementations, the tread insert component 120 has first mating features 122 arranged in a radial pattern and spaced apart from one another in a circumferential direction Dc around an inside circumference of the frame 120. In some variants, the first mating features 122 correspond to second mating features 182 located on an outer circumference of a wheel hub 180.

The second mating features 182 can be arranged in a radial pattern around the circumference of the hub 180. The tread assembly illustrated in FIGS. 13-22 includes a wheel cover configured to mate with the hub 180 that is not shown in the figures. The wheel cover can be configured to mate with the hub 180 to create a seal between the wheel cover and the hub 180. In some embodiments, the first mating features 122 and second mating features 182 are asymmetrically circumferentially distributed such that the tread insert component 120 and hub 180 can align in only one relative rotational orientation. In some such embodiments, alignment between certain features (e.g., sensors, mechanical components, electrical components, etc.) of the hub 180 and certain features of the frame 120 and/or tread 160 can be facilitated. The first mating features 122 and second mating features 182 can, in some embodiments, be circumferentially distributed in a symmetric pattern such that the insert component 120 can align with the hub 180 in a plurality of relative rotational orientations.

Figure 17:
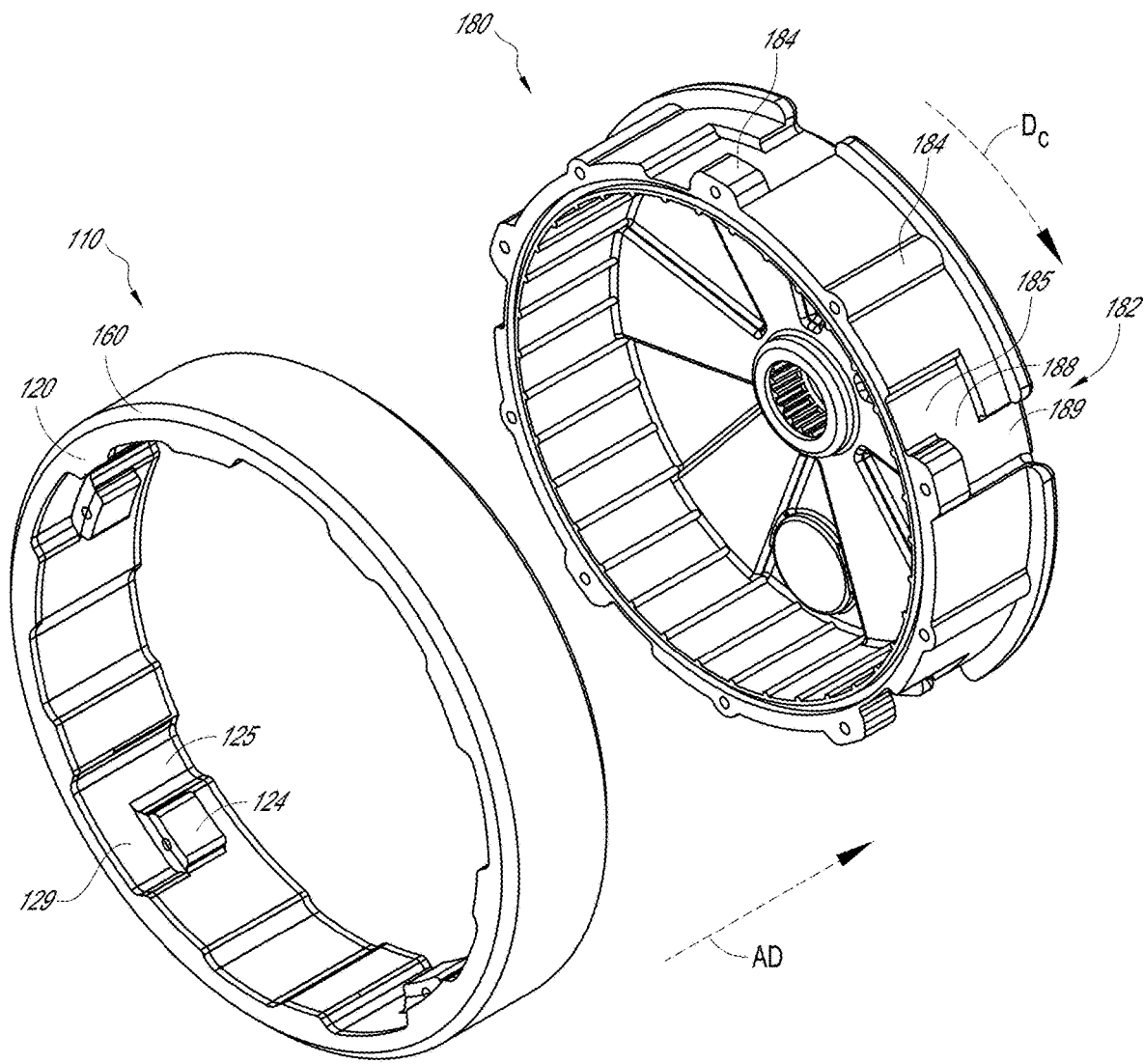
FIG. 17 illustrates an exploded view of the tread assembly of FIG. 14 and the wheel hub assembly of FIG. 16.
Figure 18:
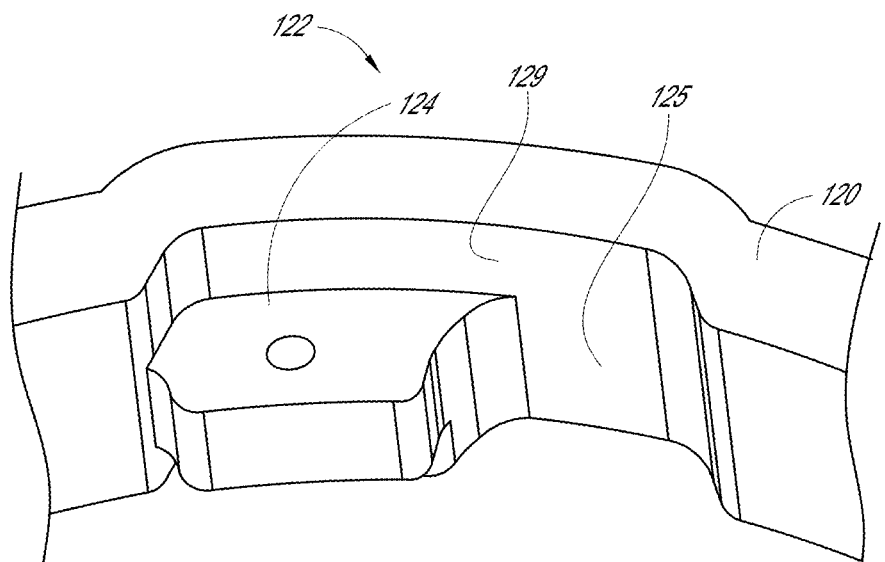
FIG. 18 illustrates a close-up view of protrusions and recesses of the frame of FIG. 13.
Figure 19:
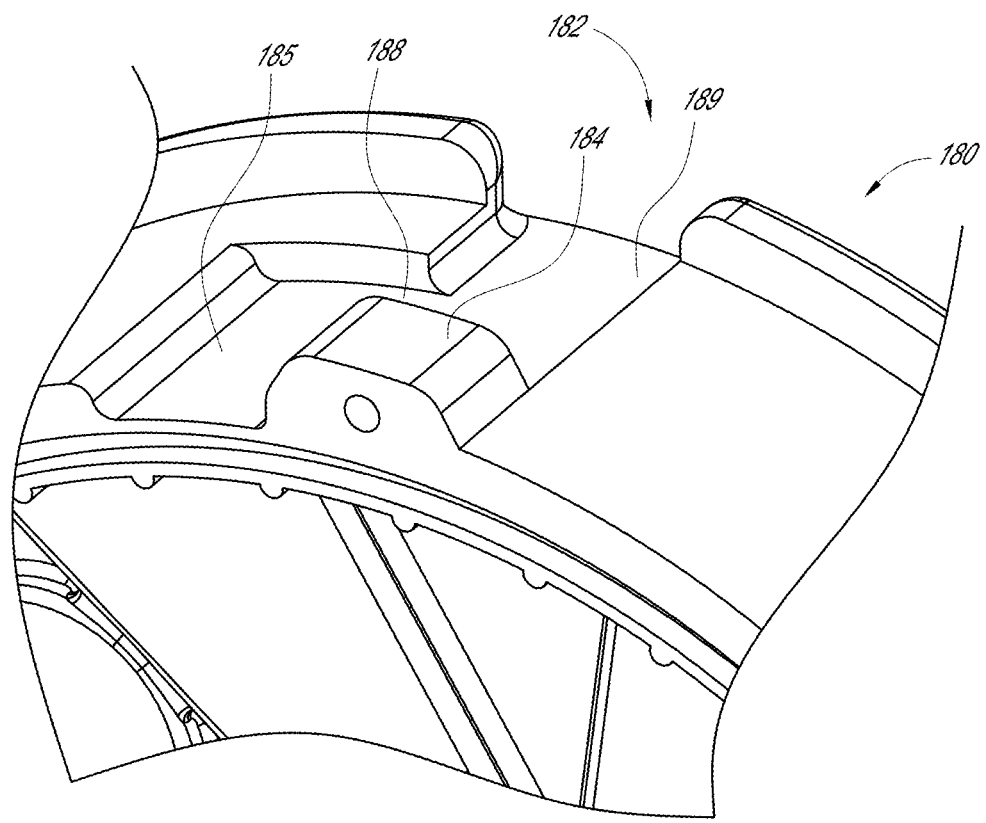
FIG. 19 illustrates a close-up view of protrusions and recesses of the wheel hub of FIG. 15.
Figure 20:
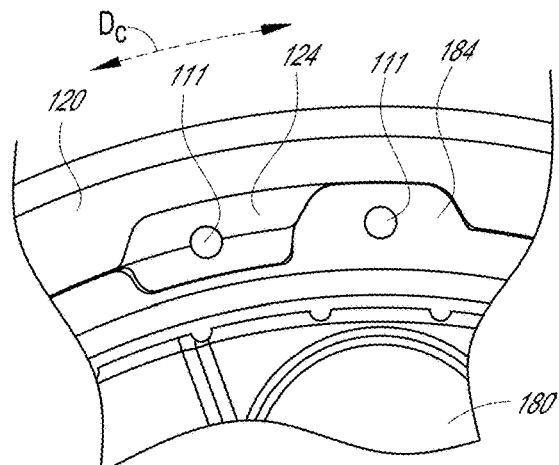
FIG. 20 illustrates a close-up view of one of the protrusions of FIG. 19 and one of the recesses of FIG. 18 in a partially assembled state.

As shown in FIGS. 17 and 18, in some variants, the first mating features 122 of the frame 120 include protrusions 124 and recesses 125. In certain embodiments, the second mating features 182 of the hub 180 include recesses 185 and protrusions 184. The first mating features 122 can be configured and arranged in such a way that the protrusions 124 can be received in the recesses 185 on the hub 180, thereby allowing the mating engagement of the protrusions 124 and the recesses 185. Similarly, the protrusions 184 on the hub 180 can be received in the recesses 125 on the insert ring 120, thereby allowing the mating engagement of the protrusions 184 and the recesses 125.

In certain embodiments, the tread insert 160 can be assembled with the wheel hub 180 by mating (e.g., by sliding) the tread insert 160 onto the hub 180. For example, the protrusion 124 on the insert 160 can be generally aligned with a portion of the recess 185 of the hub 180, thereby allowing the protrusion 124 to be slidably received (e.g., axially) in the recess 185. In some embodiments, the insert 160 is pushed onto the hub 180. In some embodiments, the tread insert 160 is pushed completely onto the hub.

In certain variants, the recess 185 has sufficient axial width (e.g., parallel with the axis of rotation) that the protrusion 124 does not circumferentially interfere with the protrusion 184, when the protrusion 124 is received in the recess 185. In some arrangements, when the protrusion 124 is received in the recess 185, the protrusion 124 has a first axial width and the protrusion 184 has a second axial width, with the first and second axial widths not axially overlapping.

Figure 21:
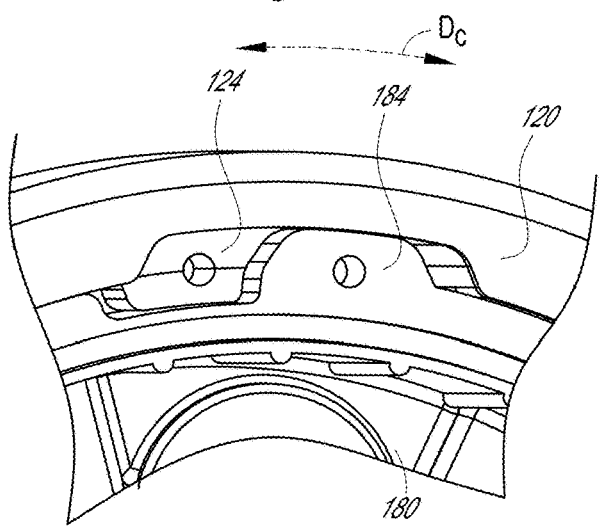
FIG. 21 illustrates a close-up view of the protrusion and recesses of FIG. 20 in another partially assembled state.
Figure 22:
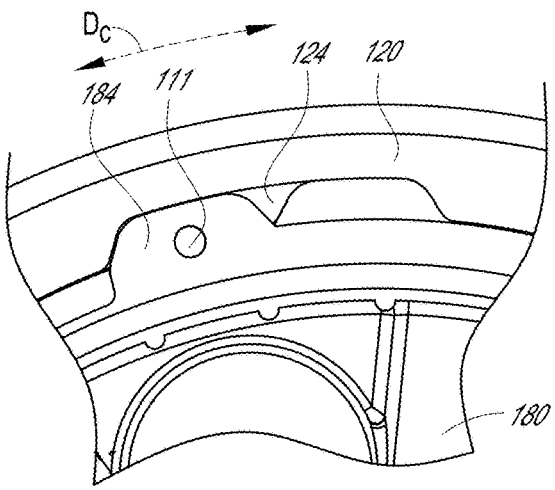
FIG. 22 illustrates a close-up view of the protrusion and recesses of FIG. 20 in an assembled state.

As shown in FIGS. 21 and 22, in some implementations, the tread insert 160 can be rotated relative to the hub 180. In some embodiments, the tread insert 160 can be rotated (e.g., in a clockwise direction relative to the hub) until it engages (e.g., abuts or otherwise is stopped by) walls that define the recess 185 of the hub 180. For example, rotation of the tread insert 160 relative to the hub 180 can cause the protrusion 124 of the insert 160 to be received into a second recess 188 extending perpendicular and generally in a circumferential direction Dc away from the recess 185. In some configurations, rotation of the tread insert 160 relative to the hub 180 can cause the protrusion 184 of the hub 80 to be received into the second recess 129 on the tread insert 120. Such a configuration can, for example, increase the strength and/or reduce the likelihood of relative movement of the insert 160 and hub 180. In some embodiments, the engagement of the insert 160 and the walls of the hub 180 facilitates torque transfer between the insert 160 and the hub 180. In certain variants, when the tread insert 160 is rotated, the protrusions 124 on the inside circumference are moved near, next to, in front of, and/or behind the protrusions 184 on the outside of the hub 180.

In certain implementations, the protrusions 124, 184 include holes 111. In certain embodiments, when the tread insert component 160 has been rotated to its final position, the holes 111 that pass through each of the protrusions 124, 184 will be aligned. In some implementations, fasteners (e.g., screws 52) can be driven into the aligned holes 111, thereby securing the tread insert 160 and hub 180 and/or inhibiting or preventing further relative rotation of the insert 160 and hub 180. Some variants include a wheel cover with a mating hole (not shown). In some embodiments, the fasteners 50, 52 secure the tread insert 160 and hub 180 and wheel cover (not shown). For example, the fasteners 50, 52 can pass through a portion of each of the tread insert 160 and hub 180 and wheel cover. Such a configuration can enhance the structural and/or watertight characteristics of the tread assembly. In some embodiments, each of the fasteners 50, 52 passes through the wheel cover. In some embodiments, the fasteners 52 used to connect the first mating feature 122 to the second mating feature 182 can have a non-standard screw driving connection (e.g., a tamper-resistant head).

In some embodiments, the tread insert 160 can be configured such that the protrusion 124 can be axially spaced apart from the protrusion 184. In some variations, the protrusion 124 of the tread insert 160 are received by a generally axially oriented third recess 189 of the second mating feature 182. Such reception of the protrusion 124 can facilitate torque transfer between the protrusion 124 and the walls defining the third recess 189. In some embodiments, engagement of the protrusion 124 with the third recess 189 can reduce stress on any fasteners 52 used to mate the first mating feature 122 with the second mating feature 182.

FIGS. 23-26 illustrate another embodiment of a wheel. The wheel can include a tread assembly 310 and housing assembly 370 that can include components or portions that are the same as or similar to the components or portions of the tread assembly 10 and housing assembly 70 described above. Some numerical references to components in FIGS. 23-26 are the same as or similar to those previously described for the tread assembly 10 and housing assembly 70 (e.g., a cover 390 is similarly numbered as the cover 90 discussed above).

Figure 23:
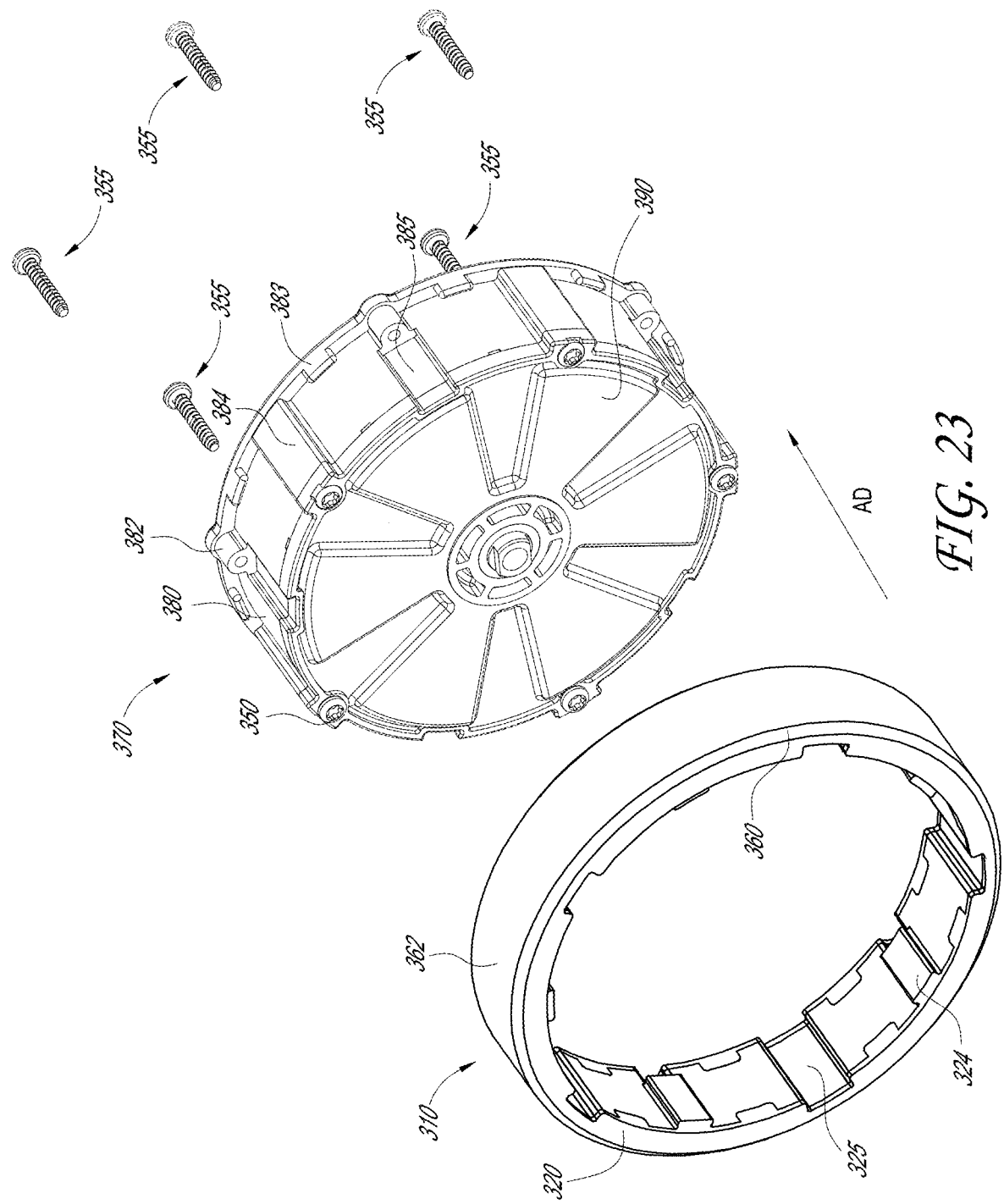
FIG. 23 illustrates an exploded perspective view of another embodiment of a wheel comprising a tread assembly and housing assembly.

According to certain embodiments, the tread assembly 310 includes a frame 320 and a tread 360. As discussed in further detail below, the frame 320 can be configured to receive and/or engage the tread 360. Certain embodiments of the frame 320 are a metal, such as aluminum, or a plastic, such as nylon. In some implementations, the frame is injection molded. In some embodiments, the tread 360 is rubber (e.g., ethylene propylene diene monomer (EPDM)). Certain variants of the tread 360 can be over-molded onto the frame 320. As shown in FIG. 23, in the assembled tread 310, the tread 360 can be positioned generally outside and around the frame 320. For example, the frame 320 can be received in the tread 360.

Figure 24:
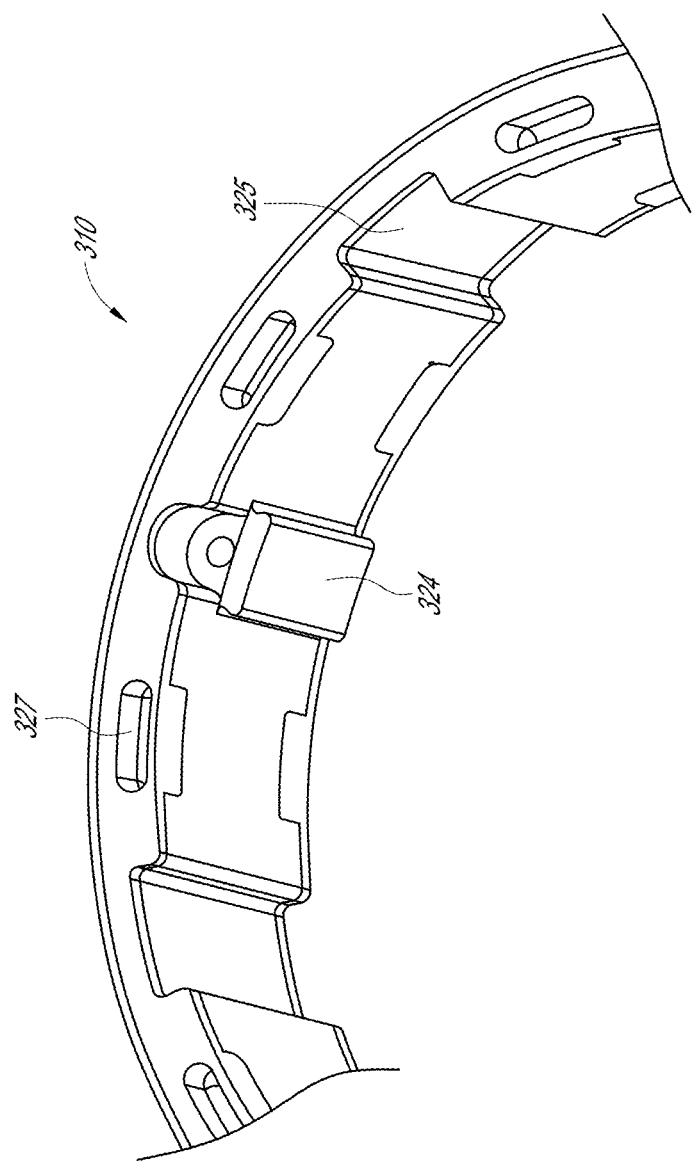
FIG. 24 illustrates a close-up perspective view of a portion of the tread assembly of FIG. 23.

In some embodiments, as illustrated in FIG. 23-24 the frame 320 includes one or more mating features. For example, the frame 320 can include one or more protrusions 324. The protrusions 324 can extend radially-inward (e.g., as measured in the frame of reference of the radius of the frame 320) from a radial inner surface of the frame 320. The protrusions 324 can include apertures configured to receive fasteners 355 (e.g., screws). In some embodiments, the protrusions 324 have a first portion radially spaced apart from a second portion. For example, the first portion can be located radially inward of the second portion. In some embodiments, the first portion has a circumferential width that is greater than a circumferential width of the second portion (e.g., located radially outward from the first portion).

In some embodiments, the frame 320 includes one or more recesses 325. The recesses 325 can extend radially-outward from a radially-inward face of the frame 320. In some embodiments, a radially-outwardly positioned portion of the recesses 325 is circumferentially wider than a radially-inwardly positioned portion of the recesses 325. For example, the circumferential width of the recesses 325 at a radially-inward edge can be less than a circumferential width of the recesses 325 at a point radially-outward from the radially-inward edge of the recesses 325.

Figure 25:
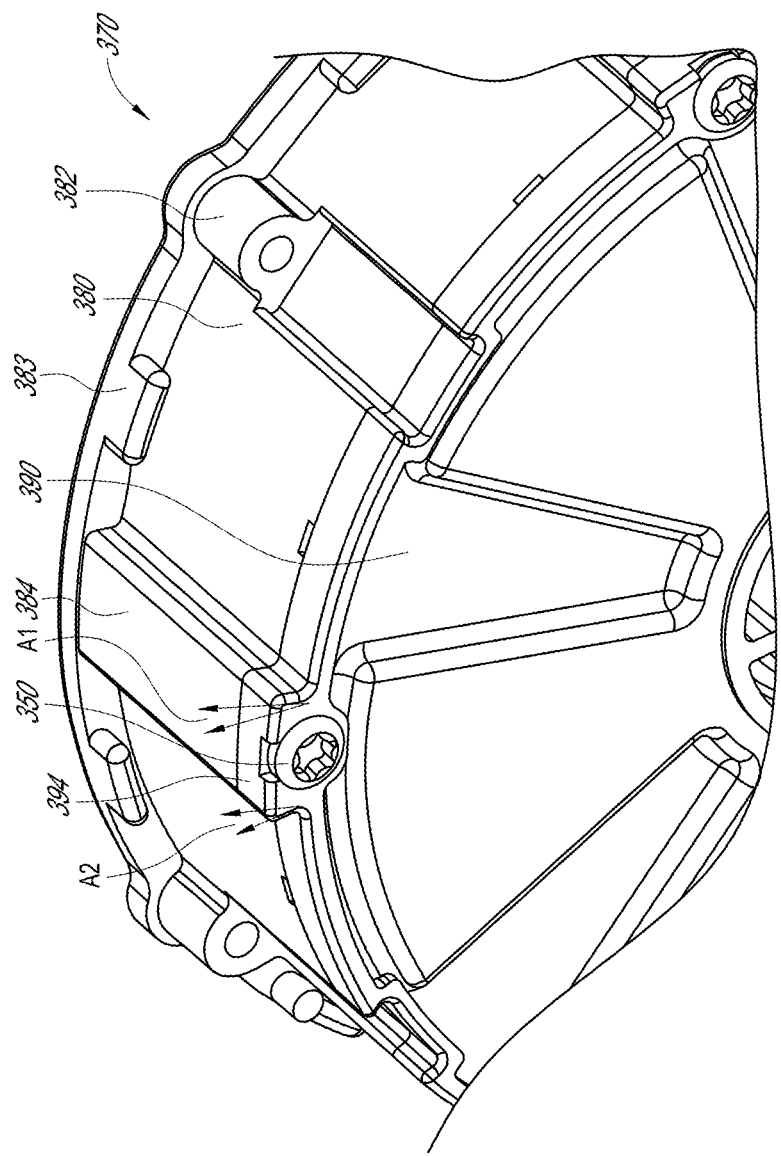
FIG. 25 illustrates a close-up perspective view of a portion of the housing assembly of FIG. 23.
Figure 26:
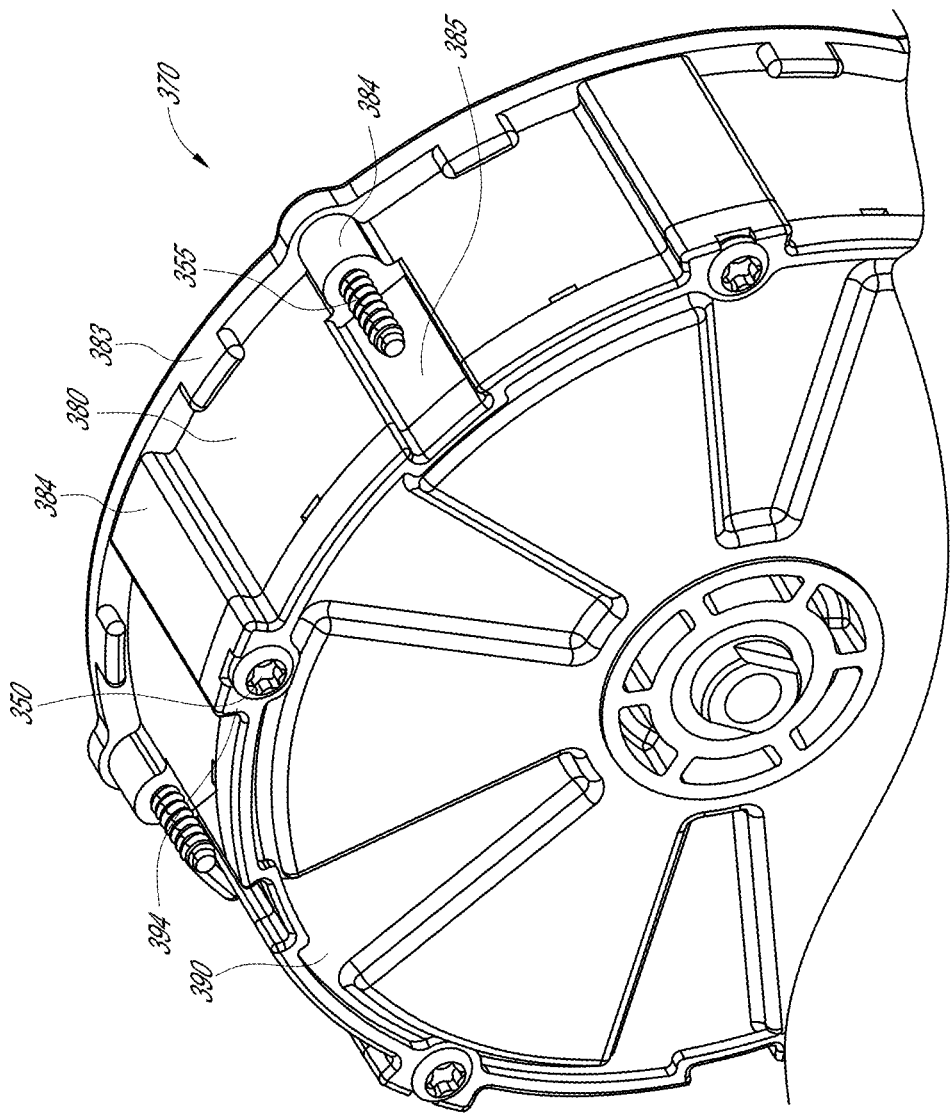
FIG. 26 illustrates a close-up perspective view of a portion of the housing assembly of FIG. 23 engaged with fasteners.

As illustrated in FIGS. 23 and 25-26, the housing assembly 370 can include a structural hub 380 configured to couple with a cover 390. For example, one or more fasteners 350 (e.g., screws) can be used to couple one or more radially-outward extending flanges 394 of the cover 390 with one or more radially-outward extending flanges 384 of the hub 380. The flanges 384, 394 can be sized and shaped to couple with the recesses 325 of the frame 320. For example, the flanges 384 and/or the flanges 394 can be correspondingly shaped with the recesses 325. In certain implementations, the flanges 384 and/or the flanges 394 extend radially-outward in a flared shape.

In some embodiments, the circumferential width of the flanges 384, 394 changes as a function of radial distance. For example, the circumferential width of the flanges 384, 394 can increase as a function of radial distance. The flanges 384 and/or the flanges 394 can have a radially distal portion and a radially proximal portion. The radially distal portion can have a first circumferential width and the radially proximal portion can have a second circumferential width. In some embodiments, the first circumferential width is larger than the second circumferential width. For example, the ratio of the first circumferential to the second circumferential width can be at least about: 1.05:1, 1.1:1, 1.25:1, 1.33:1, 1.5:1, 1.75:1, values between the aforementioned values, or otherwise.

In some embodiments, a first surface of the flanges 384 and/or the flanges 394 is angled with respect to a body portion of the hub 380 and/or cover 390, respectively. For example, the first surface can be angled in the radially-outward direction at an angle A1. In certain variants, the angle A1 is greater than or equal to about 3° and/or less than or equal to about 20°. In some embodiments, the angle A1 is less than or equal to about: 4°, 6°, 8°, 10°, 15°, 20°, 25°, values between the aforementioned values, or otherwise.

In certain embodiments, a second surface of the flanges 384 and/or the flanges 394 is angled with respect to the body portion of the hub 380 and/or cover 390, respectively. For example, the first surface can be angled in the radially-outward direction at an angle A2. According to certain variants, the angle A2 is about equal to the angle A1. In some embodiments, the angle A2 is greater than the angle A1. In certain implementations, the angle A2 is less than the angle A1.

In some embodiments, the structural hub 380 includes one or more radially-inward recesses 385. The recesses 385 can have first radially-inward portions that have circumferential widths that are greater than the circumferential widths of portions of the recesses 385 located radially-outward from the first radially-inward portions of the recesses 385. In some embodiments, the recesses 385 are sized and shaped to couple with the protrusions 324 of the frame 320.

In some embodiments, the protrusions 324 and/or the flanges 384, 394, in combination with the corresponding mating feature (e.g., the recesses 385 and 325, respectively) can inhibit or prevent relative movement of the tread assembly 310 with respect to the housing assembly 370. As illustrated in FIG. 23, the tread assembly 310 can be received in the housing assembly 370. For example, in some embodiments, some or all of the tread assembly 310 can be slid generally along an axial direction AD into the housing assembly 370. In certain variants, when the tread assembly 310 is slid onto the housing assembly 370, the protrusions 324 can be received (e.g., slidably) into the recesses 385. In some embodiments, when the tread assembly 310 is slid onto the housing assembly 370, the flanges 384, 394 can be received (e.g., slidably) into the recesses 325. The protrusions 324 can interface with the recesses 385 and/or the flanges 384, 394 can interface with the recesses 325 to inhibit relative rotation of the tread assembly 310 with respect to the housing assembly 370.

In some embodiments, the varying (e.g., as a function of radial distance) circumferential widths of the protrusions 324 and recesses 385 can inhibit or prevent radial movement of the tread assembly 310 with respect to the housing assembly 370. In some embodiments, the varying (e.g., as a function of radial distance) circumferential widths of the flanges 384, 394 and the recesses 325 can inhibit or prevent radial movement of the tread assembly 310 with respect to the housing assembly 370 and/or can help to inhibit or prevent rotational movement of the tread assembly 310 with respect to the housing assembly 370. According to some variants, inhibiting radial and/or rotational movement between the tread assembly 310 and housing assembly 370 can reduce wear on the tread 310, can decrease vibration, and/or can increase the lifespan of the tread assembly 310.

As illustrated in FIG. 23, one or more fasteners 355 can be used to couple the tread assembly 310 with the housing assembly 370. The fasteners can include a head end, which can be configured to engage with a screwdriver or other tool, and a working end opposite the head end. In some variants, the fasteners 355 can be inserted through (e.g., by a slip fit) passages in protrusions 382 of the housing assembly 370 (see FIG. 26). In various embodiments, the passages in the protrusions 382 can extend completely through the protrusions 382 in the generally axial direction such that the working end of one of the fasteners 355 can pass completely though one of the passages. The protrusions 382 can extend radially-outward from the structural hub 380.

In some embodiments, one or more of the fasteners 355 can engage apertures in the protrusions 324 of the frame 320. For example, the working ends of the fasteners can extend through the passages in the protrusions 382 of the housing assembly 370 and can engage the protrusions 324 of the frame 320. As the tread assembly 310 typically is a lower cost component (e.g., does not include certain electronics or other parts) in comparison to the hub assembly 370, and/or is a component that is more readily replaceable than the hub assembly 370, it can be desirable to position the working end in the tread assembly 310. For example, in the event that one or more of the fasteners 355 were to break or otherwise fail, which can result in the working end being generally irretrievable, it can be desirable to have the generally irretrievable working end positioned in the lower cost and/or more readily replaceable component (e.g., the tread assembly 310) than in the hub assembly 370. Accordingly, in some embodiments, all of the fasteners 355 are disposed so that the working ends of the fasteners can engage the protrusions 324 in the tread assembly 310 (e.g., in the frame 320). In some embodiments, such a configuration can facilitate reuse of the hub assembly 370 and/or reduce the likelihood of the working end of one or more of the fasteners 355 being generally irretrievably disposed in the protrusion 384, which could require discarding the hub assembly 370. In other embodiments, some (or even none) of the fasteners 355 are disposed so that the working ends of the fasteners can engage the protrusions 324 in the tread assembly 310, while other(s) of the fasteners 355 are oriented oppositely with their working ends disposed in the hub assembly 370.

FIGS. 27-32 illustrate another embodiment of a wheel. The wheel can include a tread assembly 410 and housing assembly 470 (e.g., hub) that can include components or portions that are the same as or similar to the components or portions of the tread assembly 310 and housing assembly 370 described above. Some numerical references to components in FIGS. 27-32 are the same as or similar to those previously described for the tread assembly 310 and housing assembly 370 (e.g., a frame 420 is similarly numbered as the frame 320 discussed above).

Figure 27:
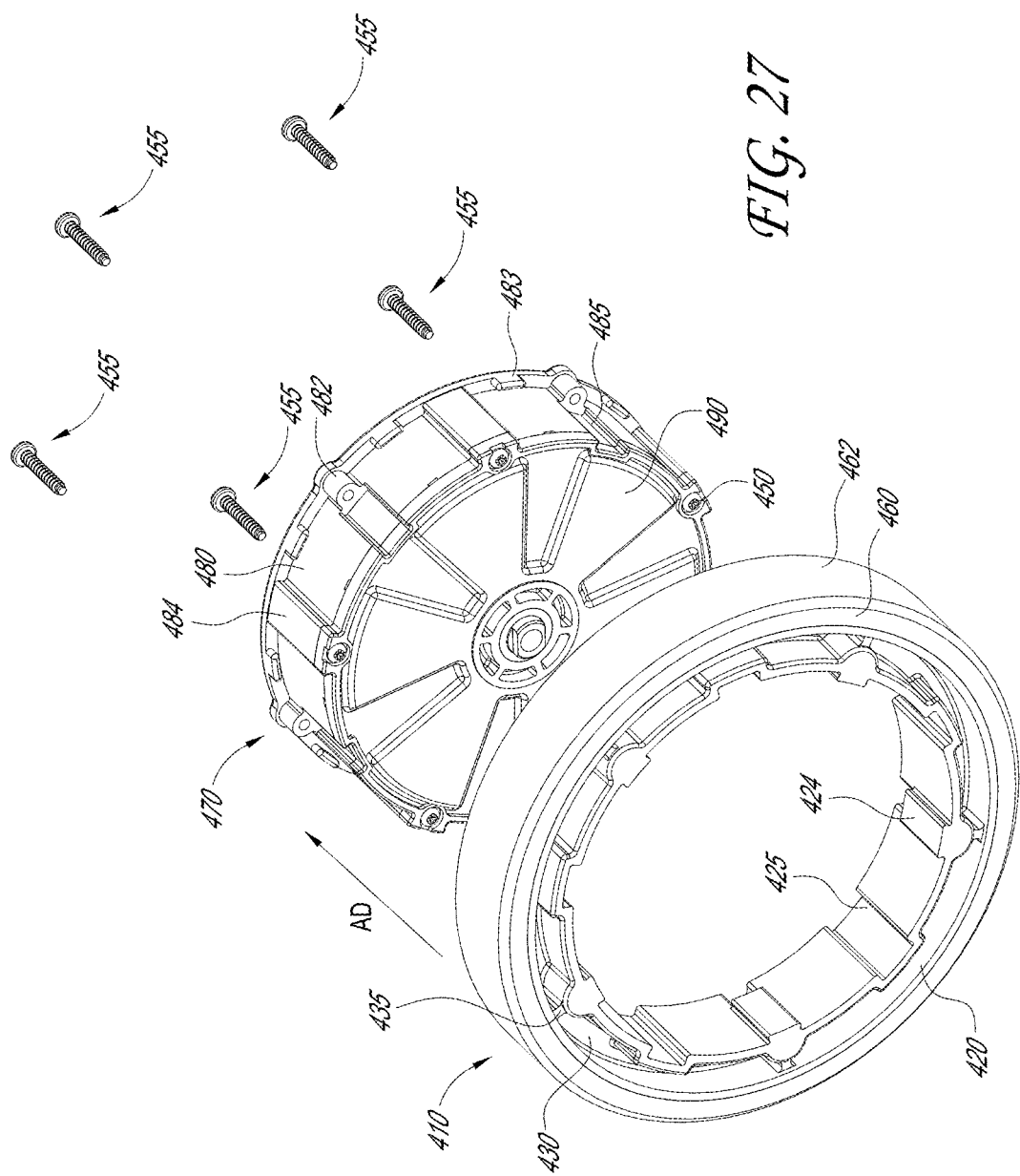
FIG. 27 illustrates an exploded perspective view of another embodiment of a wheel comprising a tread assembly and housing assembly.
Figure 28:
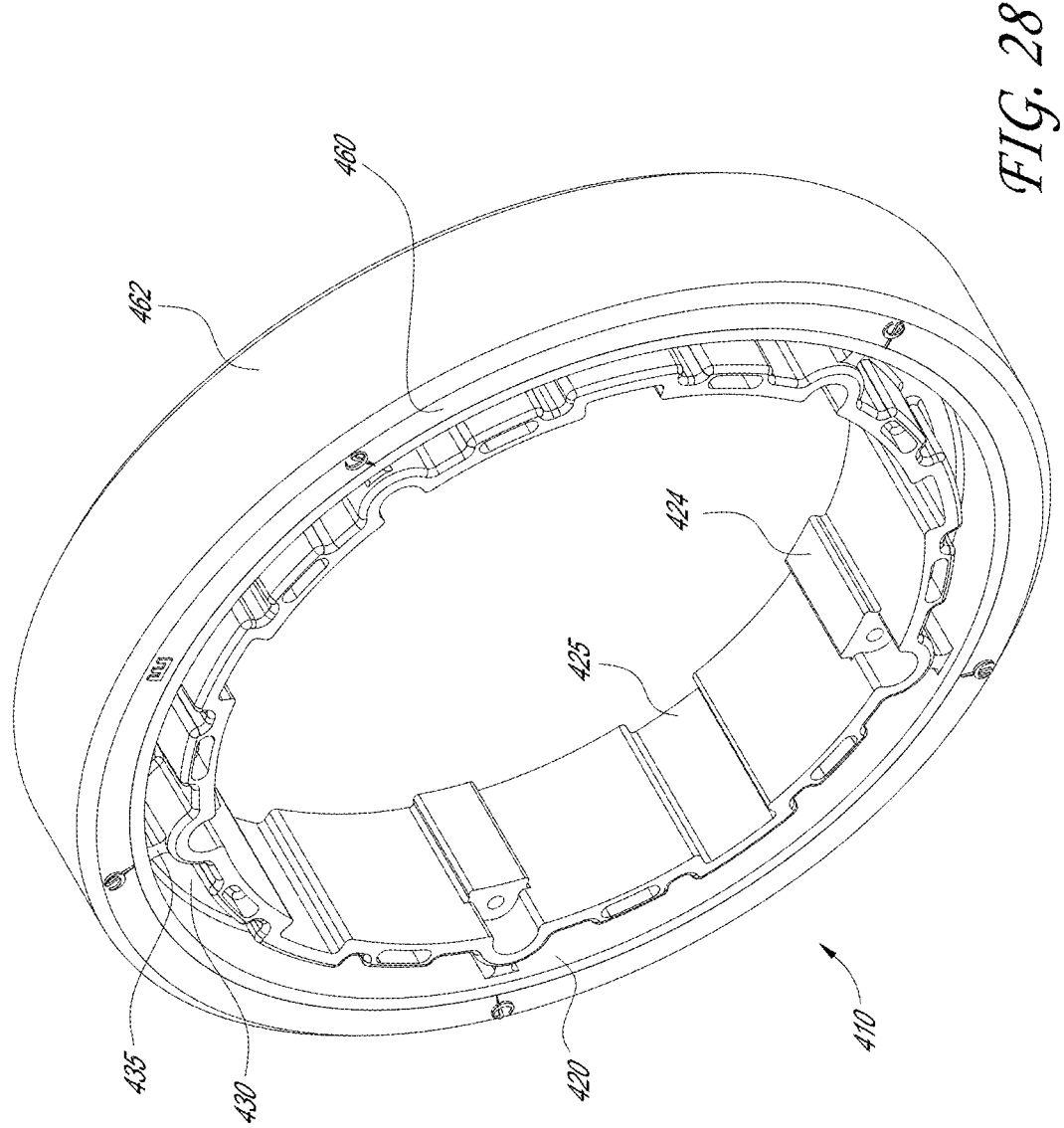
FIG. 28 illustrates a perspective view of the tread assembly of FIG. 27.
Figure 29:
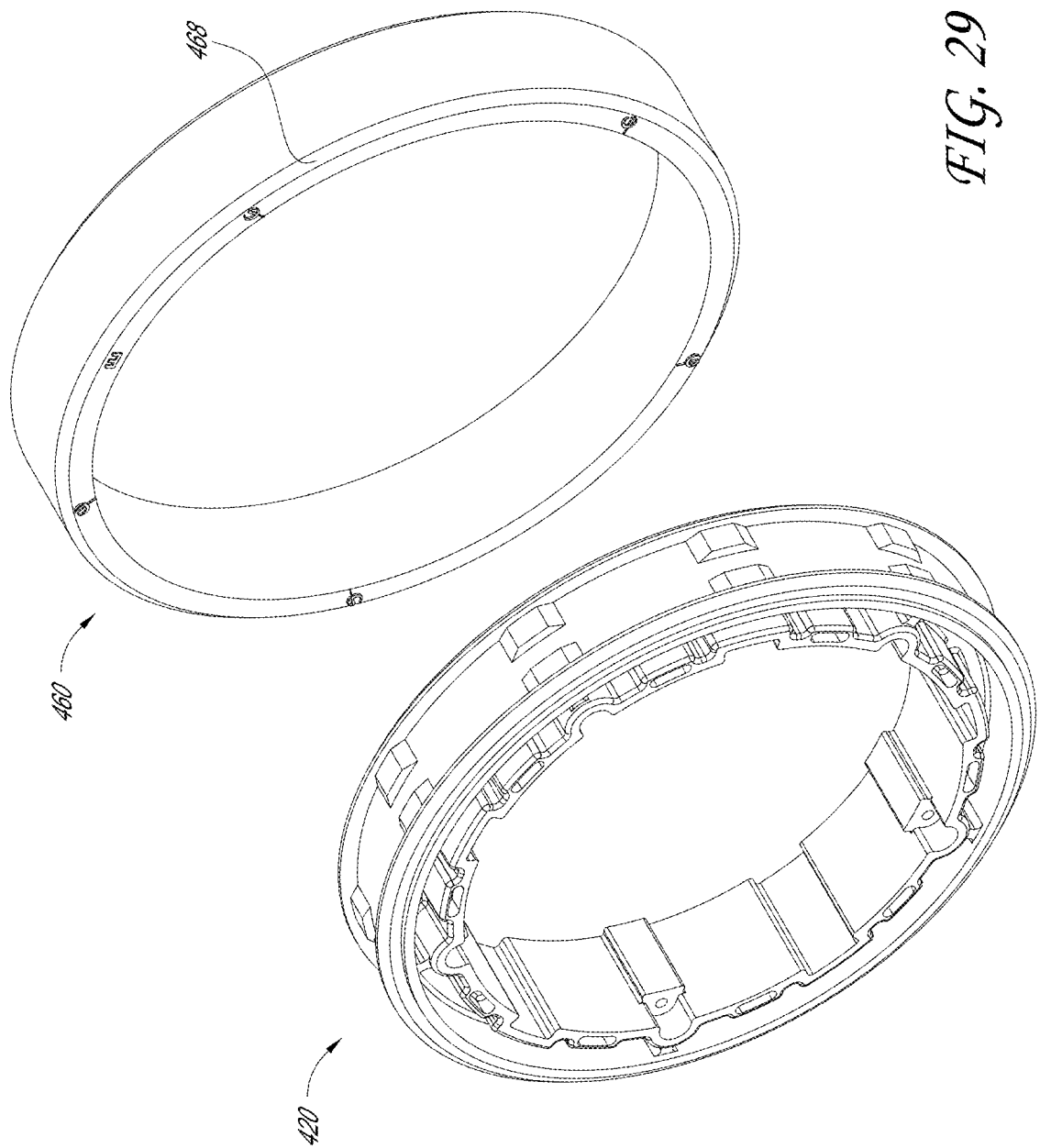
FIG. 29 illustrates an exploded perspective view of the frame and tread of the tread assembly of FIG. 27.

As illustrated in FIGS. 27-29, the tread assembly 410 can include a frame 420 and a tread 460. The tread 460 can be positioned radially outward from the frame 420 when the tread assembly 410 is in an assembled configuration. In some embodiments, the tread 460 is co-molded onto the frame 420. The tread assembly 410 can be configured to removably mate with the housing assembly 470. The housing assembly 470 can include one or more non-serviceable portions, such as an electronic component (e.g., a controller, battery or other power source, or otherwise).

In some embodiments, it is desirable to use wheels of varying diameters. For example, in certain applications using four wheels (e.g., shopping carts), it may be desirable to have rear wheels that have larger or smaller diameters than the front wheels. However, this can result in a need to inventory, order, maintain, or otherwise handle multiple wheel sizes. It may be more convenient and/or desirable to inventory a single housing assembly 470 configuration (e.g., size and/or model) that is adapted to mate with different tread sizes.

As described in further detail below, the housing assembly 470 can engage with a frame 420. In some embodiments, the frame 420 is similar or identical to the frame 310. For example, for some variants of the tread 460 having a first inside diameter, an inside of the frame 420 can directly mate with an outside of the housing assembly 470. In some embodiments, such as embodiments in which the tread 460 has a second inside diameter (e.g., greater than an outside diameter of the housing assembly 470 by at least about 5 mm), the frame 420 is includes an adapter, such as a spacer 430 or other radial-spacing structure. In some such embodiments, the spacer 430 can span some or all of the radial gap between the tread 460 and the housing assembly 470. In various implementations, such a design can facilitate use of treads 460 having different diameters with a single housing assembly 470 configuration (e.g., size). In several embodiments, the spacer 430 can facilitate using various tread 460 sizes with a common housing assembly 470. As used herein, the term "common" has its normal and ordinary meaning (e.g., joint; the characteristic of being shared by two or more things; or otherwise). For example, in some embodiments, treads 460 having different configurations (e.g., outside diameters) are adapted to each receive and/or matingly engage with a common (e.g., the same) housing assembly 470.

Figure 30:
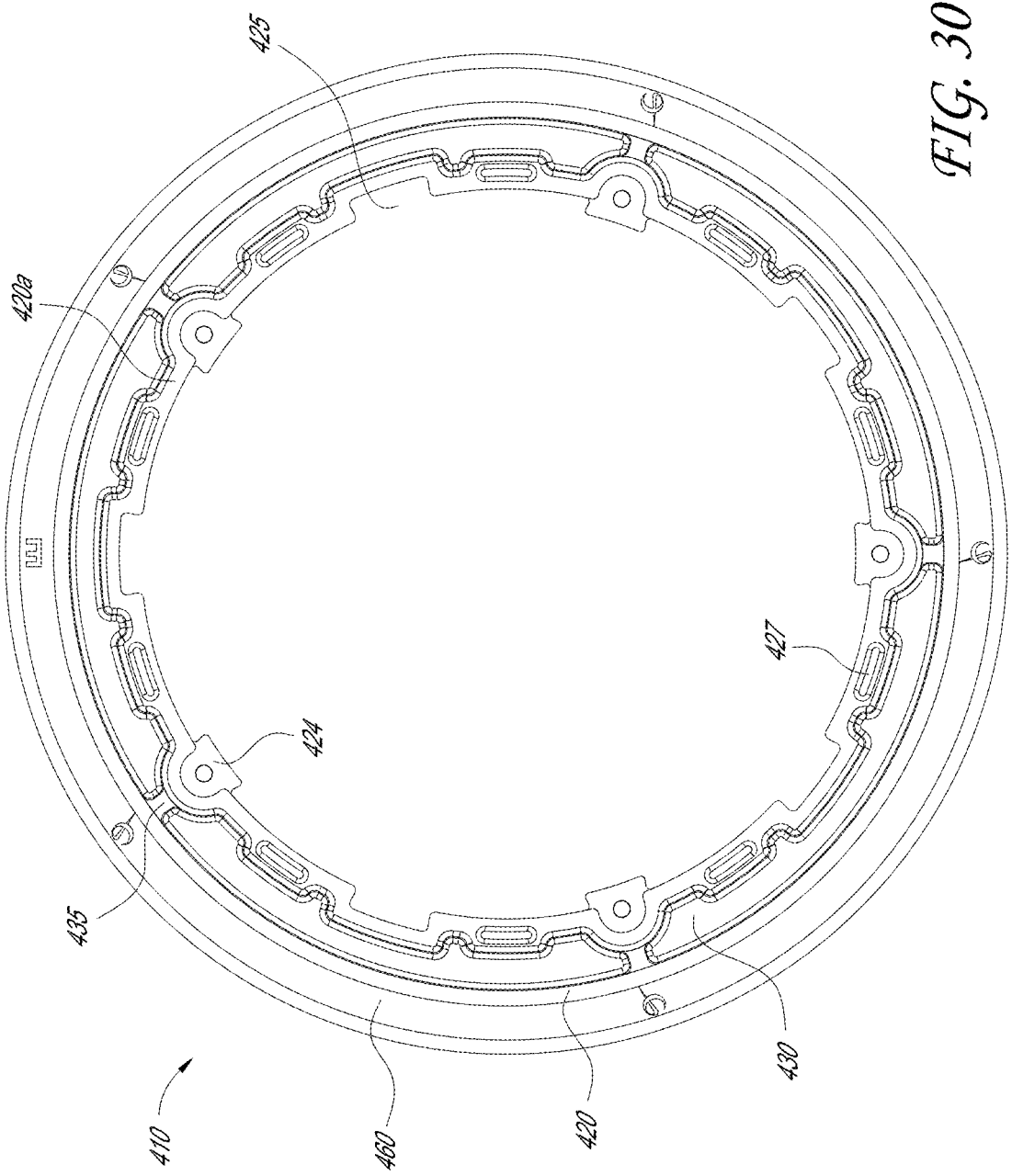
FIG. 30 illustrates a front plan view of the tread assembly of FIG. 27.
Figure 31:
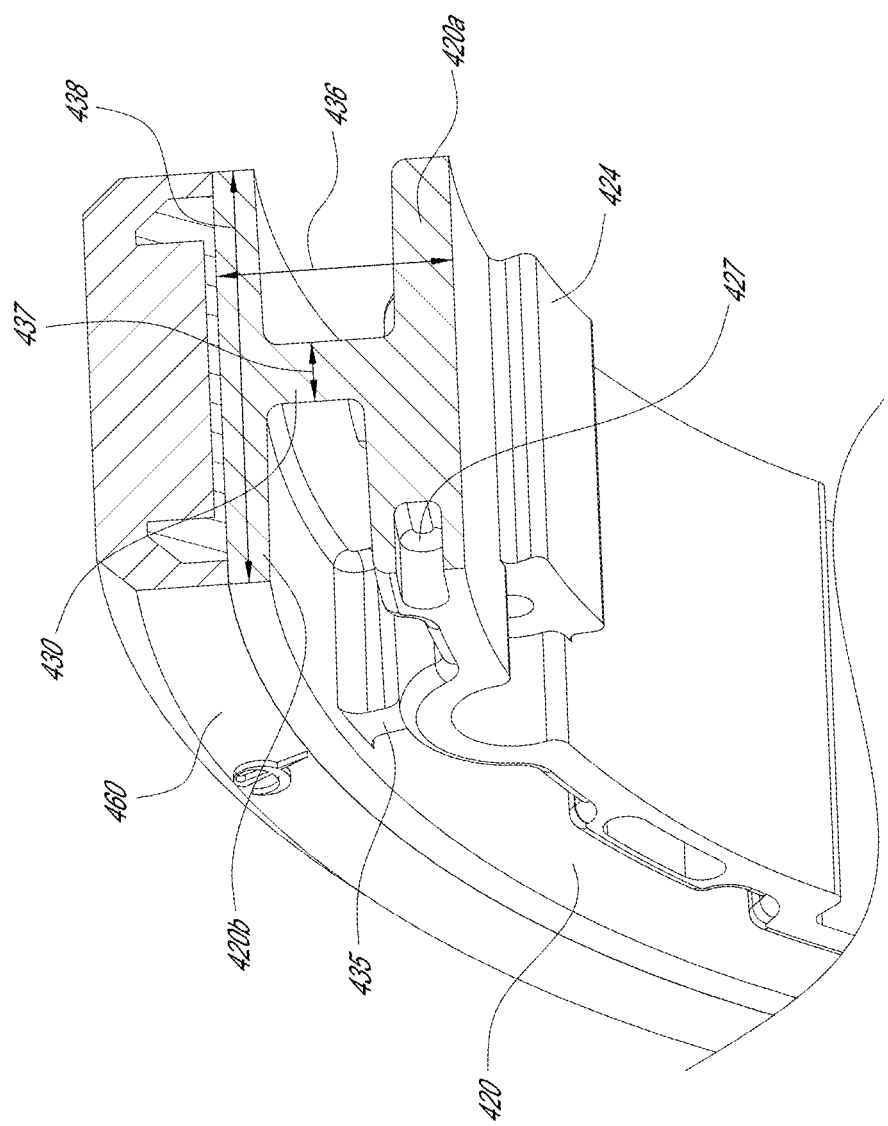
FIG. 31 illustrates a partial cross-section perspective view of the tread assembly of FIG. 27.

As illustrated in FIGS. 30-31, the frame 420 can have an inner radial portion 420a including one or more mating features (e.g., protrusions 424, recesses 425, alignment features 427, etc.). The inner radial portion 420a can be sized and shaped to mate with a single (e.g., a standardized) configuration (e.g., size, model, mating features, etc.) of the housing assembly 470. In some embodiments, the inner radial portion and/or mating features of the frame 420 are radially inwardly spaced from the tread 460 and/or from an outer radial portion 420b of the frame 420 (e.g., a portion of the frame 420 configured to engage with the tread 460). For example, the frame 420 can include the spacer 430. The spacer 430 can be positioned between the inner radial portion of the frame 420 and the outer radial portion 420b of the frame 420.

As illustrated in FIG. 31, the spacer 430 can comprise a circumferential wall, or some other similar structure. In some embodiments, the spacer 430 can include one or more cut-outs, apertures, protrusions, indentations, or other surface features along the circumference of the spacer 430. The spacer 430 can have a radial height 436. The radial height 436 of a spacer 430 of a particular frame 420 can be determined by the desired wheel diameter. For example, in some embodiments, the radial height 436 can be greater than or equal to about 2 mm and/or less than or equal to about 25.4 mm. In some embodiments, the radial height 436 is greater than or equal to about 3.2 mm and/or less than or equal to about 13.3 mm. In some embodiments, the height 436 is approximately 5 mm. Many variations are possible.

In some embodiments, the radial thickness 436 of the spacer 430 is less than a radial thickness 433 of the tread 460. In some embodiments, the radial thickness 436 of the spacer 430 is greater the radial thickness 433 of the tread 460. For example, the radial thickness 436 of the spacer 430 can be greater than or equal to about 102% of the radial thickness of the tread 460 and/or less than or equal to about 240% of the radial thickness of the tread 460. In some embodiments, the radial thickness 436 of the spacer 430 is at least approximately 185% of the radial thickness of the tread 460.

According to certain embodiments, the spacer 430 can have an axial thickness 437 (e.g., a thickness parallel to the axial direction AD). The axial thickness 437 of the spacer 430 can be less than or equal to an axial thickness 438 of a radially outward portion of the frame 420, such as the outer radial portion 420b. For example, the axial thickness 437 of the spacer 430 can be greater than or equal to about 5% of the axial thickness 438 of a radially outward portion of the frame 420 and/or less than or equal to about 80% of an axial thickness 438 of a radially outward portion of the frame 420. In some embodiments, the axial thickness 437 of the spacer 430 is approximately 15% of the axial thickness 438 of a radially outward portion of the frame 420. In some embodiments, a radially inward portion of the frame 420 has substantially the same axial thickness as the radially outward portion of the frame 420. In some embodiments, a frame 420 having a spacer 430 that has a smaller axial thickness than the axial thickness of the radially inward and radially outward portions 420a, 420b of the frame 420 can reduce material costs and/or facilitate manufacturability (e.g., molding). In some embodiments, an axially thin spacer 430 can facilitate a light-weight frame 420.

As illustrated in FIGS. 27-32, the spacer 430 can include one or more stabilizing elements (e.g., ribs 435). The stabilizing elements can increase the strength and/or rigidity of the frame 420. This can inhibit or prevent relative movement and/or wobble (e.g., rotation about an axis other than the rotational axis of the wheel) between the tread 460 and the housing assembly 470 when the tread assembly 410 is installed on the housing assembly 470. For example, an axial rib 435 can be positioned radially outward from one or more of the protrusions 424 of the frame 420. In some embodiments, an axial rib 435 extends radially outward from each of the protrusions 425. Some or all of the axial ribs 435 can have an axial thickness that is less than or equal to the axial thickness 438 of the radially outward portion 420b of the frame 420. For example, the axial thickness of the axial ribs 435 can be greater than or equal to about 50% of the axial thickness 438 of the radially outward portion 420b of the frame 420 and/or less than or equal to about 95% of the axial thickness 438 of the radially outward portion 420b of the frame 420. In some examples, the axial rib 435 has an axial thickness of at least approximately 95% of the axial thickness 438 of the radially outward portion of the frame 420.

Figure 32:
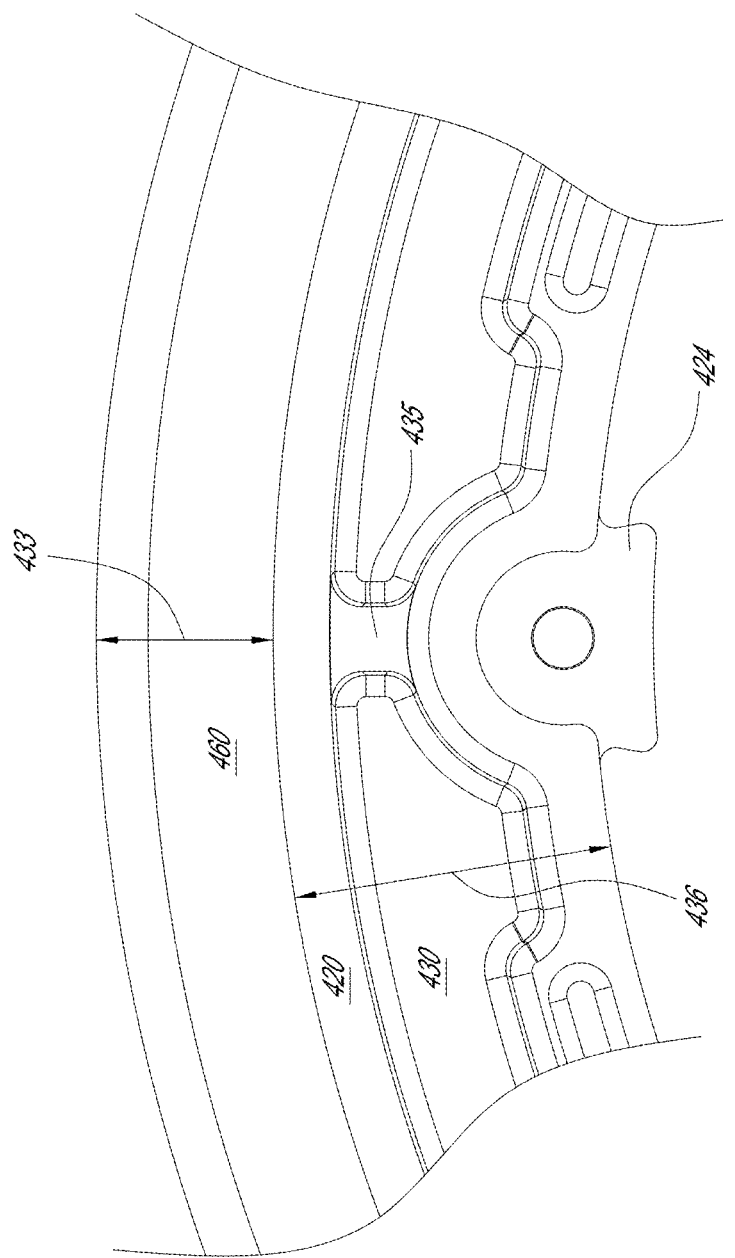
FIG. 32 illustrates a partial close-up front plan view of the tread assembly of FIG. 27.
Figure 33:
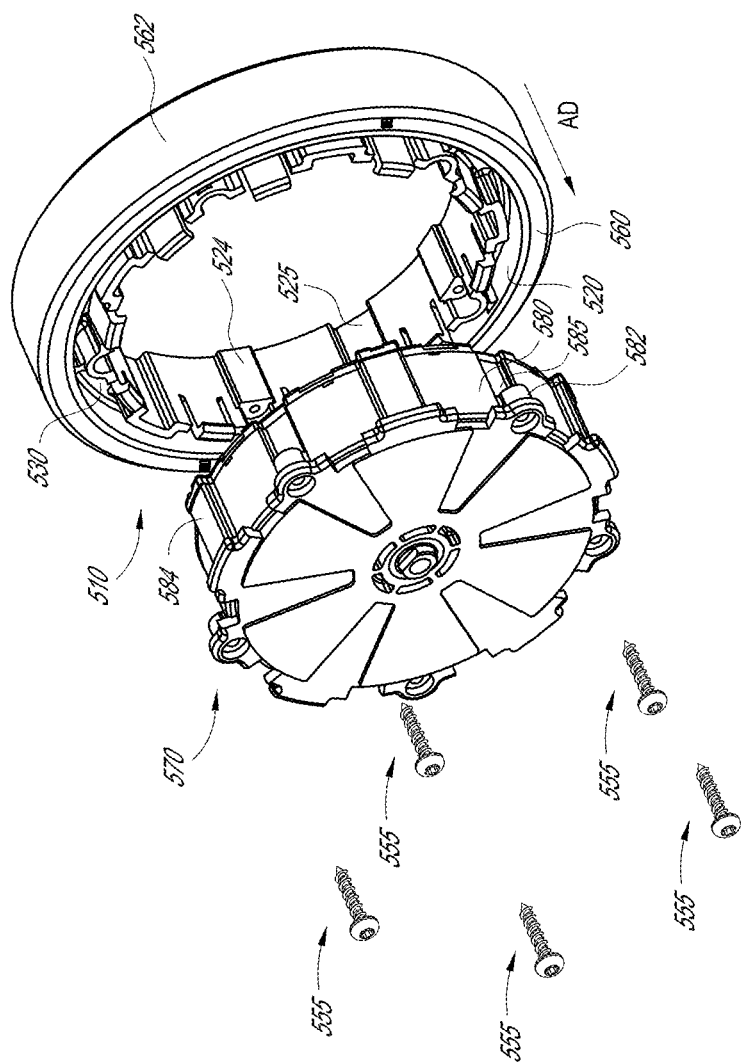
FIG. 33 illustrates an exploded perspective view of another embodiment of a wheel comprising a tread assembly and housing assembly.
Figure 34:
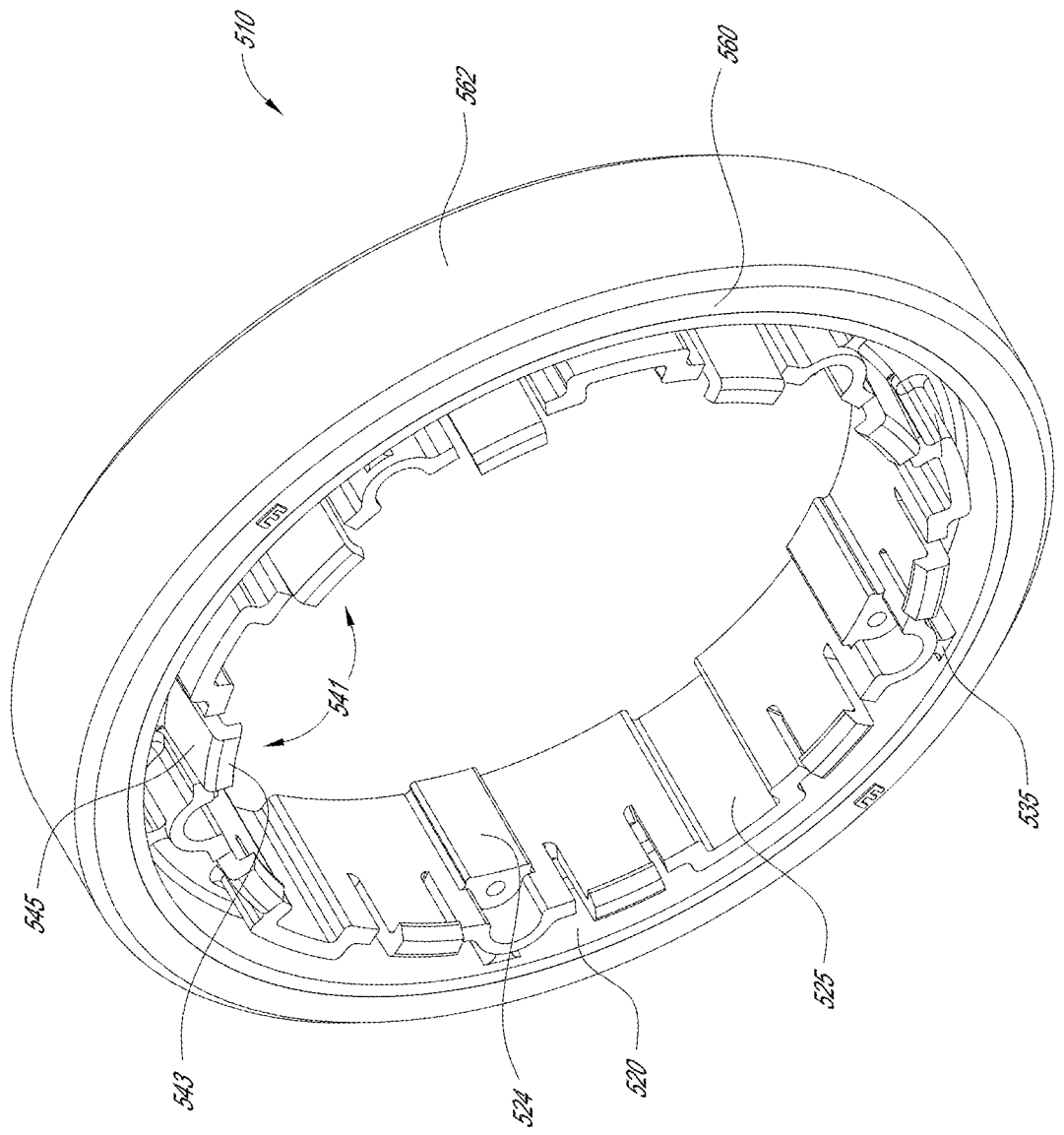
FIG. 34 illustrates a perspective view of the tread assembly of FIG. 33.
Figure 35:
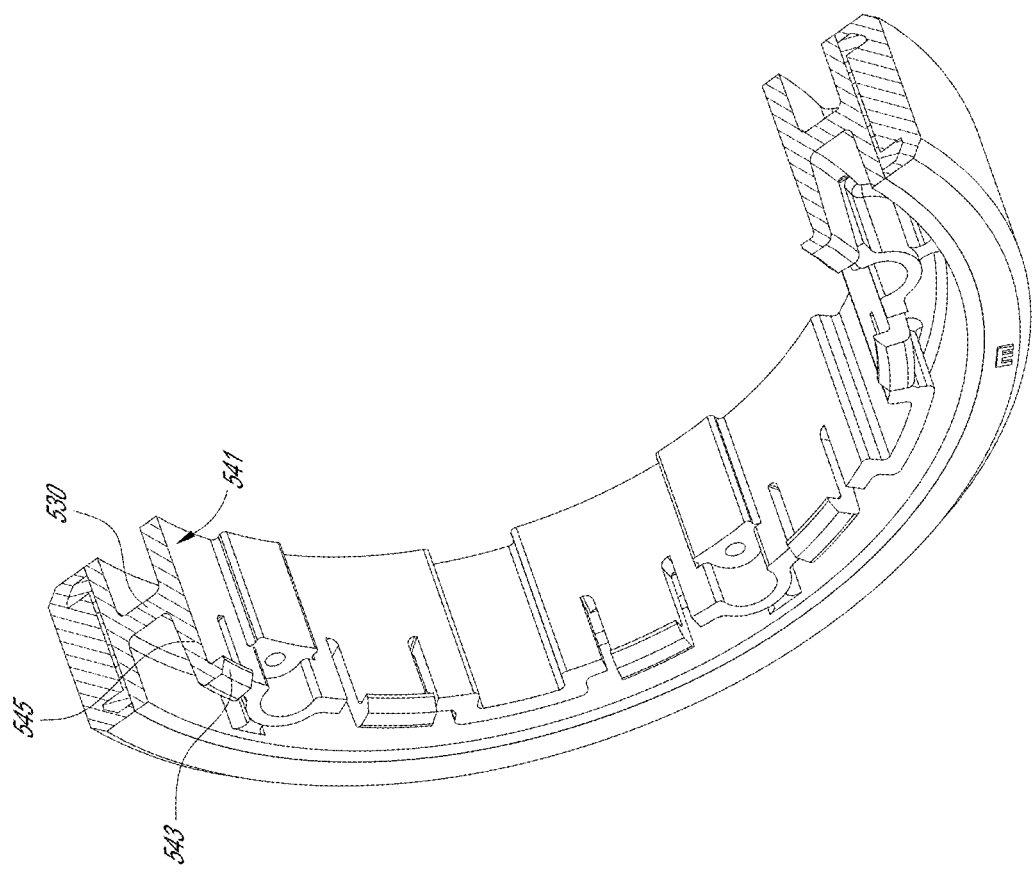
FIG. 35 illustrates a partial cross-section perspective view of the tread assembly of FIG. 33.
Figure 36:
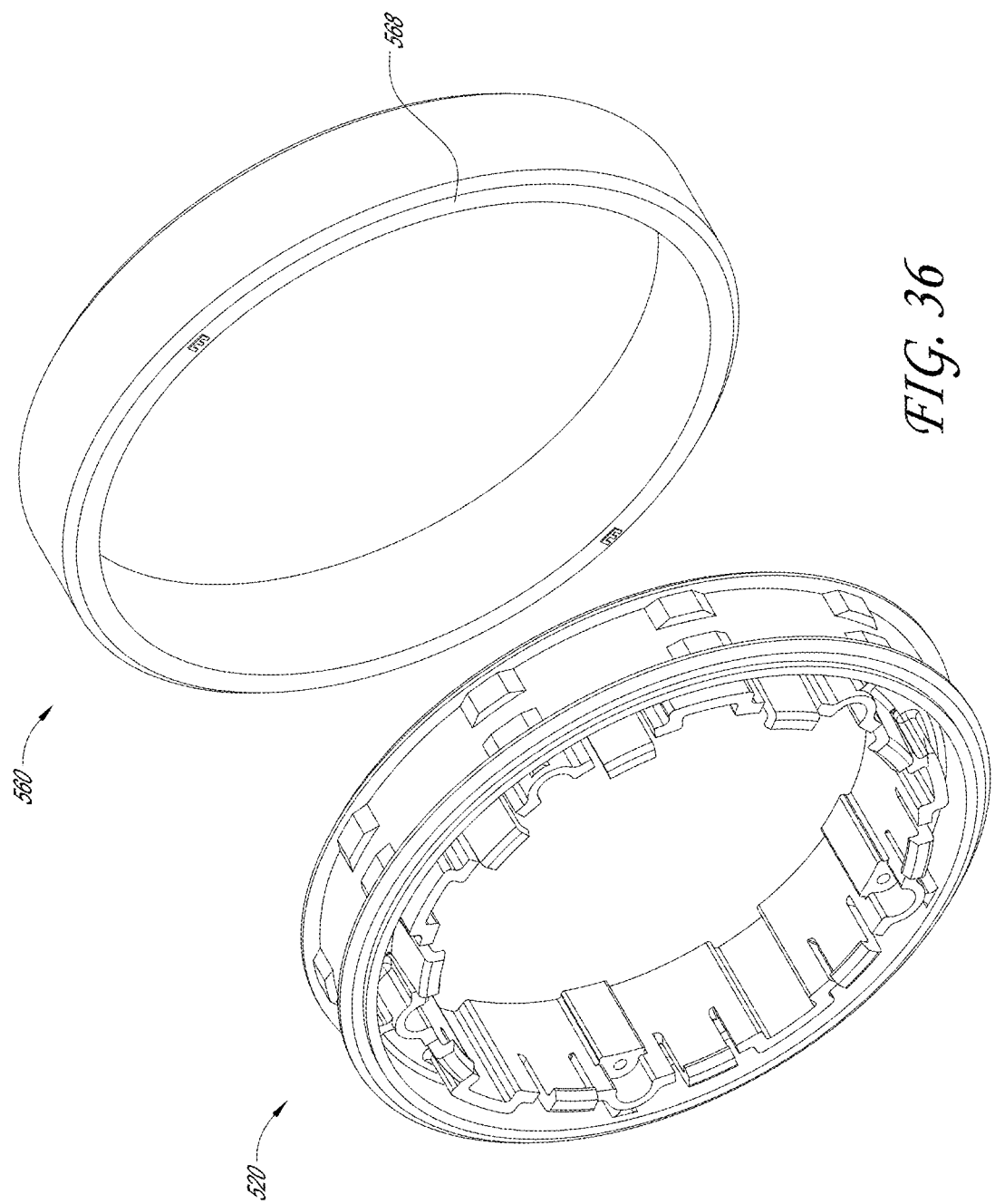
FIG. 36 illustrates an exploded perspective view of the frame and tread of the tread assembly of FIG. 33.
Figure 37:
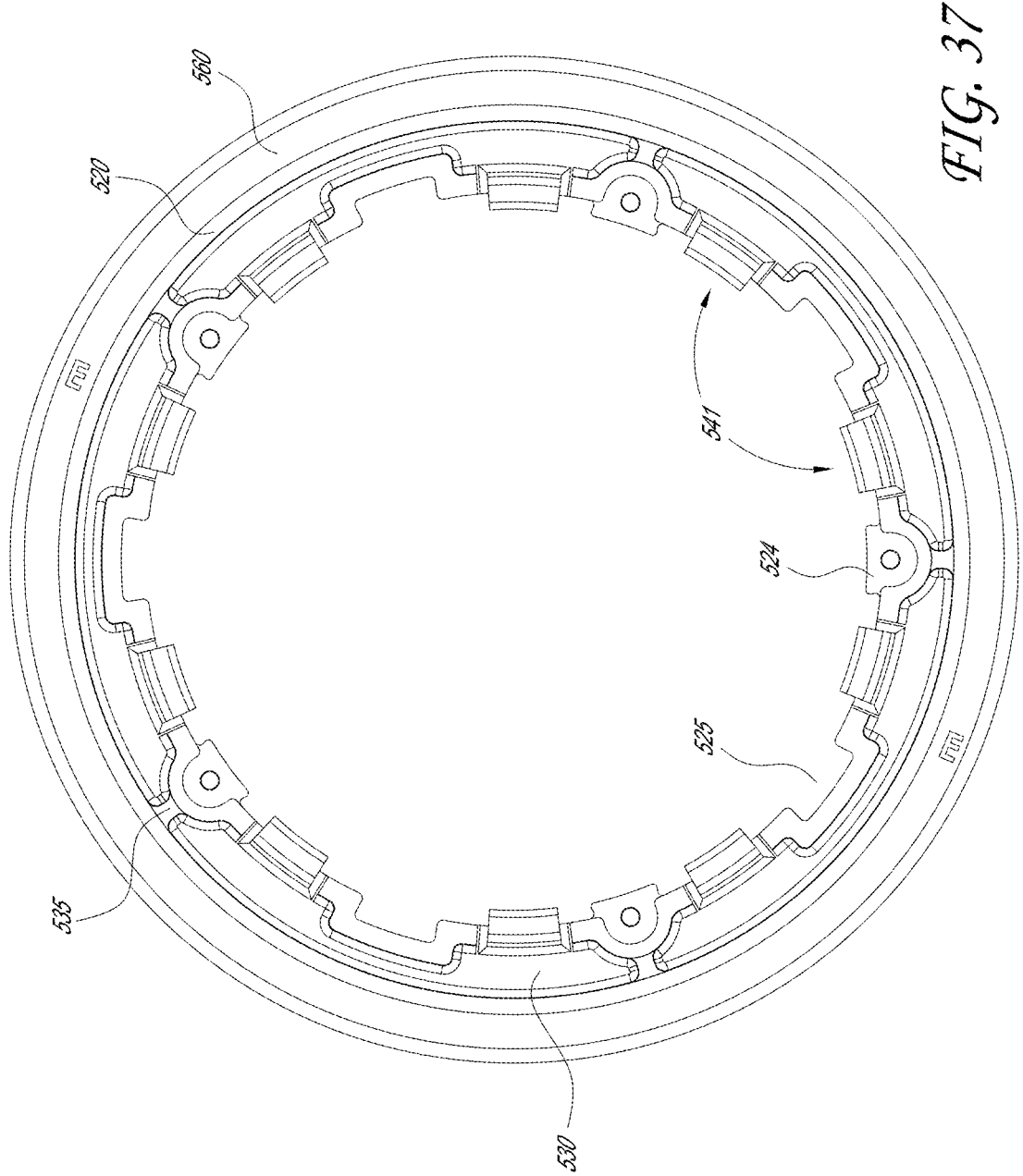
FIG. 37 illustrates a front plan view of the tread assembly of FIG. 33.

As illustrated in FIG. 32, a radial distance between a radial inward surface of the protrusion 424 and the tread portion 460 can be greater than a radial thickness 433 of the tread portion 460. For example, the radial distance between a radial inward surface of the protrusion 424 and the tread portion 460 can be greater than or equal to about 125% of the radial thickness 433 of the tread portion 460 and/or less than or equal to about 300% of the radial thickness 433 of the tread portion 460. In some embodiments, the radial thickness between an inner radial surface of the protrusion 424 and the tread 460 is at least approximately 215% of the radial thickness 433 of the tread 460.

FIGS. 33-39 illustrate another embodiment of a wheel. The wheel can include a tread assembly 510 and housing assembly 570 (e.g., hub) that can include components or portions that are the same as or similar to the components or portions of the tread assembly 410 and housing assembly 470 described above. Some numerical references to components in FIGS. 33-39 are the same as or similar to those previously described for the tread assembly 410 and housing assembly 470 (e.g., a frame 520 is similarly numbered as the frame 420 discussed above).

As illustrated in FIGS. 34-37, the frame 520 can include one or more tread securement features 541. The tread securement features 541 can be, for example, locking flanges or other structure configured to inhibit axial and/or circumferential movement between the frame 520 and the housing assembly 570 when the frame 520 is connected to (e.g., engaged with) the housing assembly 570.

The tread securement features 541 can include a locking portion 543. In some embodiments, the locking portion 543 is a tooth, protrusion, or other surface feature configured to engage with a portion of the housing assembly 570. As discussed in further detail below, the locking portion 543 can engage a portion of the housing assembly 570 to facilitate securing of the tread assembly 510 and the housing assembly 570.

The tread securement features 541 can include a deflection portion 545. For example, a deflection portion 545 of the tread securement features 541 can permit deflection of the locking portion 543 during engagement and/or during disengagement of the locking portion 543 with a portion of the housing assembly 570. In some embodiments, the deflection portion 545 can be constructed from a flexible and/or semi-flexible material (e.g., a polymer or metal). In various embodiments, the deflection portion 545 is configured to resiliently deflect in a generally radial direction, such as radially outwardly. As discussed in further detail below, in some embodiments, the deflection portion 545 can be configured to resiliently deflect with certain amounts of deflection (e.g., less than or equal to about: 1 mm, 2 mm, 3 mm, 4 mm, 5 mm, values between the aforementioned values, and otherwise) and to non-resiliently deflect with certain other amounts of deflection (e.g. greater than the amount of resilient deflection).

Figure 38:
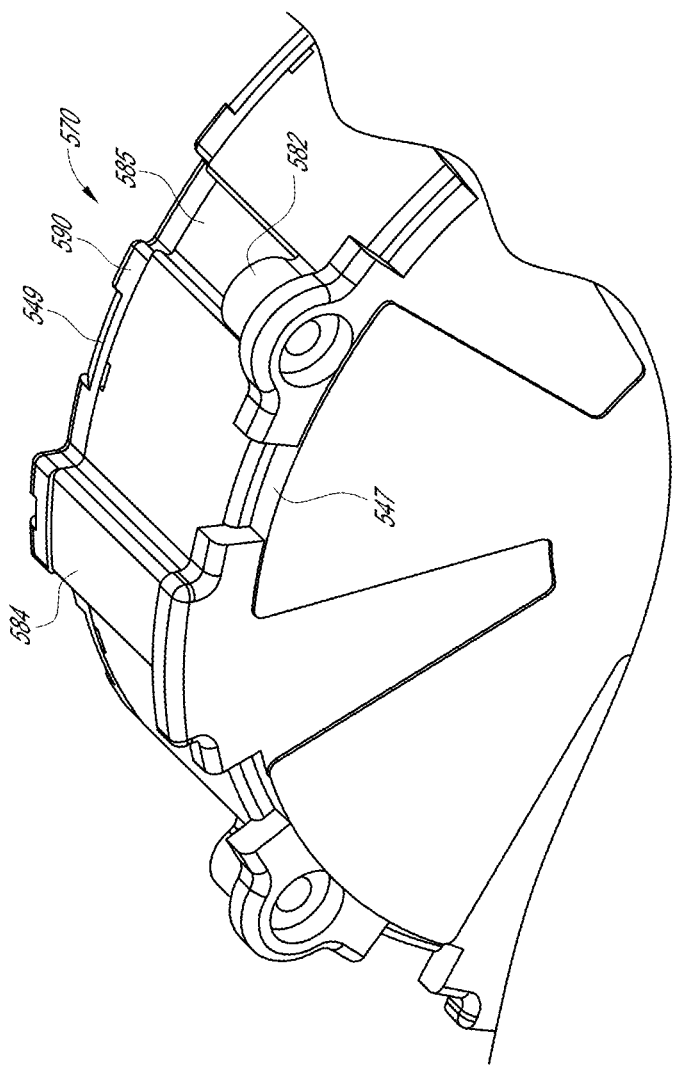
FIG. 38 illustrates a close-up perspective view of the housing assembly of FIG. 33.
Figure 39:
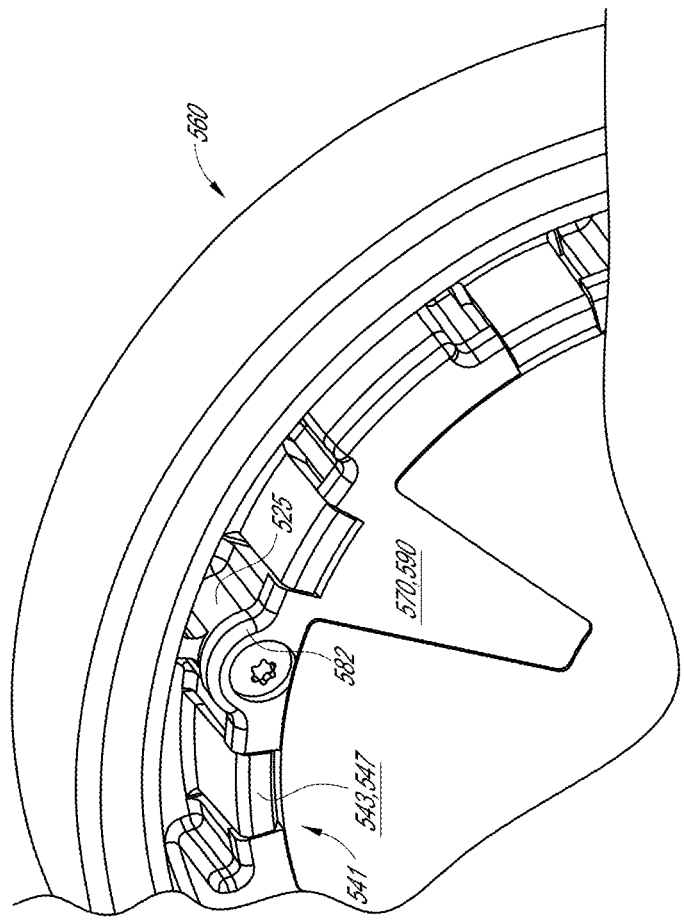
FIG. 39 illustrates a close-up perspective view of the wheel of FIG. 33.

As illustrated in FIGS. 38 and 39, the housing assembly 570 can include one or more frame engagement features 547. For example, the housing assembly 570 can include one or more indentations, grooves, protrusions or other surface features which can engage (e.g. releasably or permanently) with a portion of the tread securement features 541 of the frame 520. In some embodiments, the frame engagement features 547 are configured to receive the locking portions 543 of the tread securement features 541.

In some embodiments, the housing assembly 570 and/or cover 590 include one or more assembly facilitating features, such as indentations 549. The indentations 549 can be sized and shaped to engage with the locking portion 543 of the tread securement features 541 of the frame 520. For example, the indentations 549 can have a sloped surface configured to radially deflect (e.g., radially outward) the locking portion 543 of the tread securement features 541 as the locking features are transitioned to an engaged position with the frame engagement features 547 along the axial direction AD. In various embodiments, the assembly facilitating features are generally circumferentially aligned with the frame engagement features 547. For example, as illustrated in FIG. 38, the indentations 549 and the frame engagement features 547 are generally circumferentially aligned. In some implementations, the indentations 549 are on one axial side of the housing assembly 570 and the frame engagement features 547 are on the axially opposite side of the housing assembly 570. In some embodiments, the indentations 549 and the frame engagement features 547 are connected by a channel (not shown).

During assembly of the tread assembly 510 with the housing assembly 570, the tread securement features 541 can be circumferentially aligned with the indentations 549. The tread assembly 510 can be moved axially relative to the housing assembly 570. This can engage the securement features 541 with the indentations 549, which can result in the securement features 541 being deflected (e.g., radially outwardly) by the slope of the indentations 549. The tread assembly 510 can travel axially over the housing assembly 570. With continued axial movement, the locking portion 543 of the tread securement features 541 can engage (e.g., deflect into) the frame engagement features 547 on the housing assembly 570, as shown in FIG. 39. This can secure the tread assembly 510 with the housing assembly 570.

As illustrated in FIG. 39, the locking portions 543 of the tread securement features 541 can engage with the frame engagement features 547 of the housing assembly 570. As noted above, this can secure the tread assembly 510 with the housing assembly 570. However, some embodiments are configured to facilitate removal of the tread assembly 510 from the housing assembly 570, such as when the tread 560 has become worn or damaged. For example, in certain implementations, a tool (e.g., a screwdriver or other similar tool) can be used to deflect the locking portion 543 of a tread securement feature 541 of the frame 520 away (e.g., radially outward) from the axial locking feature 547 of the housing assembly 570. Certain implementations are configured such that a portion of the tool can be used as a lever or wedge, such as between the locking portion 543 and the tread securement feature 541. This can facilitate disengagement of the locking portion 543 from the frame engagement feature 547, thereby allowing the tread assembly 510 to be axially removed from the housing assembly 570.

Some embodiments include a plurality of locking portions 547 and a plurality of frame engagement features 547. In certain such embodiments, all of the locking portions 543 will need to be disengaged from the frame engagement features 547 for the tread assembly 510 to be axially removed from the housing assembly 570. This can provide additional security, because even if one or more of the locking portions 543 are inadvertently disengaged from the frame engagement features 547, the tread assembly 510 can remain secured to the housing assembly 570.

In some embodiments, some portion of the tread securement feature 541, such as the deflection portion 545, can include one or more features configured to form a weakened or frangible region on the tread securement feature 541. For example, the deflection portion 545 can include one or more indentations, notches, or other surface features. In some variants, the frangible portion (e.g., a notch, slot, portion of narrowed material thickness, portion of decreased material strength, or otherwise) can be positioned on the deflection portion 545. The frangible portion can to permit a user to break (e.g., non-resiliently deflect) the axial engagement portion 541 during removal of the tread assembly 510 from the housing assembly 570. For example, the frangible portion can be configured to break upon deflection of the locking portion 543 beyond a certain extent in a radially outward direction (e.g., with a tool, such as a screwdriver). In various embodiments, the frangible portion is adapted to break when the locking portion 543 has been deflected at least about: 2 mm, 5 mm, 10 mm, 15 mm, 20 mm, values in between the aforementioned values, or otherwise.

The ability to break tread securement features 541 (e.g., with the frangible portion) can, for example, reduce the likelihood of the locking portion 543 resiliently deflecting back into engagement with the indentation 549. This can facilitate removal of the tread assembly 510 from the housing assembly 570. In some embodiments, breaking the tread securement features 541 can provide confirmation that the tread assembly 510 has been used. Such confirmation can reduce the likelihood that a user inadvertently reinstalls a used tread assembly 510 onto a housing assembly 570.

Although the present disclosure has been described in terms of certain preferred embodiments and certain preferred uses, other embodiments and other uses that are apparent to those of ordinary skill in the art, including embodiments and uses which do not provide all of the features and advantages set forth herein, are also within the scope of the present disclosure. Components, elements, features, acts, or steps can be arranged or performed differently than described and components, elements, features, acts, or steps can be combined, merged, added, or left out in various embodiments. For example, any or all of the features of the tread assembly of FIGS. 1-12 can be used with the tread assembly of FIGS. 13-22 and/or FIGS. 23-26, and any or all of the features of the tread assembly of FIGS. 13-22 and/or FIGS. 23-26 can be used with the tread assembly of FIGS. 1-12. Also, the wheels and tread assemblies shown and described herein can be used on any type of non-motorized wheeled vehicle, human-propelled vehicle, or cart such as a shopping cart, a hospital or medical device cart, wheelchair, an equipment cart, and so forth. Indeed, all possible combinations and subcombinations of elements and components described herein are intended to be included in this disclosure. No single feature or group of features is necessary or indispensable for every embodiment. Accordingly, the scope of certain embodiments of the present disclosure is to be defined by the claims that follow and their obvious modifications and equivalents.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise. As yet another example, in certain embodiments, the terms "generally perpendicular" and "substantially perpendicular" refer to a value, amount, or characteristic that departs from exactly perpendicular by less than or equal to 15 degrees, 10 degrees, 5 degrees, 3 degrees, 1 degree, 0.1 degree, or otherwise.

Similarly, while operations may be depicted in the drawings or described in the specification in a particular order, it is to be recognized that such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in other implementations. Moreover, the separation of various system components in the implementations described above should not be understood as requiring such separation in all implementations, and it should be understood that the described components and systems can generally be integrated together in a single product or packaged into multiple products. Additionally, other implementations are within the scope of the following claims. In some cases, the actions recited in the claims can be performed in a different order and still achieve desirable results.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various embodiments and examples of wheel assemblies and methods have been disclosed. Although the wheel assemblies and methods have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. For example, while some embodiments have been described in connection with shopping carts, some embodiments can be configured to be used with other types of non-motorized wheeled vehicles. This disclosure expressly contemplates that any of the various features and aspects of the disclosed embodiments can be combined with, or substituted for, one another. Accordingly, the scope of this disclosure should not be limited by the particular disclosed embodiments described above, but should be determined only by a fair reading of the claims that follow.

The following is claimed:

1. A wheel for a human-propelled cart, the wheel comprising:
    a hub having an inner cavity and comprising a frame engaging surface having a first mating feature, the inner cavity configured to receive an electrical component;
    a tread assembly configured to axially receive a portion of the hub, the tread assembly having a generally circular shape and an axis of rotation, the tread assembly comprising:
        an annular tread configured to engage a surface on which the wheel is configured to roll; and
        a frame configured to engage with the annular tread, the frame comprising:
            a radially outward portion configured to be received in the annular tread;
            a radially inward portion having a hub engaging surface, the hub engaging surface having a second mating feature and being configured to releasably couple with the frame engaging surface of the hub; and one or more tread securement features configured to inhibit axial movement of the frame relative to the hub, wherein the one or more tread securement features comprise a locking flange adapted to engage a frame engagement feature of the hub when the hub is received in the tread assembly, thereby inhibiting movement of the hub relative to the frame in a direction substantially parallel to the axis of rotation of the tread assembly.

2. The wheel of claim 1, wherein the one or more tread securement features comprise a radially-deflectable portion connected to the locking flange and to the radially inward portion of the frame.

3. The wheel of claim 2, wherein the radially-deflectable portion is configured to permit deflection of the locking flange during engagement or disengagement of the locking flange.

4. The wheel of claim 2, wherein the radially-deflectable portion is configured to resiliently deflect in a radial direction.

5. The wheel of claim 2, wherein the radially-deflectable portion comprises an at least partially flexible material.

6. The wheel of claim 2, wherein the radially-deflectable portion comprises a polymer of a metal.

7. The wheel of claim 2, wherein the radially-deflectable portion comprises a frangible region.

8. The wheel of claim 7, wherein the frangible region comprises a notch, a slot, a region of narrowed thickness, or a region having decreased material strength relative to surrounding regions of the radially-deflectable portion.

9. The wheel of claim 2, wherein the radially-deflectable portion is configured to resiliently deflect for deflections less than a threshold for resilient deflection and to non-resiliently deflect for deflections greater than the threshold for resilient deflection.

10. The wheel of claim 1, further comprising a plurality of fasteners, each of the plurality of fasteners configured to engage from a first axial side of the wheel.

11. The wheel of claim 1, further comprising a radially-extending spacer portion connecting the radially inward portion and the radially outward portion, the spacer portion having an axial thickness in the direction substantially parallel to the axis of rotation of the tread assembly that is less than an axial thickness of the radially outward portion of the frame and less than an axial thickness of the radially inward portion of the frame.

12. The wheel of claim 1, wherein the electrical component comprises a brake mechanism.

13. The wheel of claim 1, wherein the electrical component comprises a transceiver.

14. The wheel of claim 13, wherein the transceiver is configured to transmit and receive RF signals at a frequency of at least approximately 2.4 GHz.

* * * * *